United States Patent
Bondarenko et al.

(10) Patent No.: US 9,965,464 B2
(45) Date of Patent: May 8, 2018

(54) AUTOMATIC PROCESS GUIDANCE

(71) Applicant: Microsoft Technology Licensing, LLC, Redmond, WA (US)

(72) Inventors: Maksym Bondarenko, Seattle, WA (US); Manali Dongre, Bellevue, WA (US); Maryam Khabazan, Redmond, WA (US); Sharrief Shabazz, Seattle, WA (US); Hans Have, Seattle, WA (US); Dipanjan Ghosh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 231 days.

(21) Appl. No.: 14/958,489

(22) Filed: Dec. 3, 2015

(65) Prior Publication Data
US 2016/0162475 A1 Jun. 9, 2016

Related U.S. Application Data

(63) Continuation-in-part of application No. 14/695,683, filed on Apr. 24, 2015, now abandoned.

(60) Provisional application No. 62/212,927, filed on Sep. 1, 2015, provisional application No. 62/088,472, filed on Dec. 5, 2014.

(51) Int. Cl.
| | | |
|---|---|---|
| *G10L 21/00* | (2013.01) | |
| *G10L 15/00* | (2013.01) | |
| *G10L 13/00* | (2006.01) | |
| *G06F 17/28* | (2006.01) | |
| *G10L 15/22* | (2006.01) | |
| *G06F 11/36* | (2006.01) | |
| *G06F 11/34* | (2006.01) | |

(52) U.S. Cl.
CPC .......... *G06F 17/28* (2013.01); *G06F 11/3414* (2013.01); *G06F 11/3636* (2013.01); *G06F 11/3664* (2013.01); *G06F 11/3684* (2013.01); *G10L 13/00* (2013.01); *G10L 15/22* (2013.01); *G06F 11/3438* (2013.01); *G06F 2201/865* (2013.01)

(58) Field of Classification Search
CPC ....... G10L 15/22; G10L 15/265; G10L 17/22; G10L 17/005; G06F 3/167; G06F 17/2705; G06F 17/2765
See application file for complete search history.

(56) References Cited

U.S. PATENT DOCUMENTS

| | | |
|---|---|---|
| 5,038,316 A | 8/1991 | Hempleman et al. |
| 5,388,993 A | 2/1995 | McKiel et al. |

(Continued)

OTHER PUBLICATIONS

International Preliminary Report on Patentability for International Patent Application No. PCT/US2015/061767, dated Mar. 24, 2017, date of filing: Nov. 20, 2015, 7 pages.

(Continued)

*Primary Examiner* — Edgar Guerra-Erazo
(74) *Attorney, Agent, or Firm* — Christopher J. Volkmann; Kelly, Holt and Christenson, PLLC

(57) ABSTRACT

User interactions with a computing system are sensed and recorded. The recording represents a process for controlling a computer system. Voice input are received and the computer system actions that are taken based upon the voice inputs and a task recording.

19 Claims, 23 Drawing Sheets

(56) References Cited

U.S. PATENT DOCUMENTS

| | | | |
|---|---|---|---|
| 5,442,759 A | | 8/1995 | Chiang et al. |
| 5,535,422 A | | 7/1996 | Chiang et al. |
| 5,602,982 A | | 2/1997 | Judd et al. |
| 5,655,130 A | | 8/1997 | Dodge et al. |
| 5,748,841 A | * | 5/1998 | Morin .................. G06F 3/16 704/257 |
| 5,758,318 A | * | 5/1998 | Kojima ................ G10L 15/22 704/246 |
| 6,421,822 B1 | | 7/2002 | Pavela |
| 6,535,713 B1 | | 3/2003 | Houlihan et al. |
| 6,823,281 B2 | | 11/2004 | Friedman et al. |
| 7,092,928 B1 | * | 8/2006 | Elad .................. G06F 17/3089 704/260 |
| 7,137,126 B1 | * | 11/2006 | Coffman ......... G06F 17/30899 704/200 |
| 7,461,352 B2 | * | 12/2008 | Katsuranis ............ G06F 3/011 715/800 |
| 7,890,806 B2 | | 2/2011 | Kwong et al. |
| 8,005,639 B2 | | 8/2011 | Ding et al. |
| 8,161,459 B2 | | 4/2012 | Gorthi et al. |
| 8,443,336 B2 | | 5/2013 | Vieira et al. |
| 8,644,755 B2 | | 2/2014 | Krebs et al. |
| 8,826,084 B1 | | 9/2014 | Gauf et al. |
| 2004/0143819 A1 | | 7/2004 | Cheng et al. |
| 2005/0208461 A1 | | 9/2005 | Krebs et al. |
| 2006/0136221 A1 | | 6/2006 | James et al. |
| 2007/0220341 A1 | | 9/2007 | Apostoloiu et al. |
| 2007/0255607 A1 | | 11/2007 | Staby et al. |
| 2008/0114604 A1 | | 5/2008 | Wei et al. |
| 2009/0132994 A1 | | 5/2009 | Doggett et al. |
| 2010/0151889 A1 | * | 6/2010 | Chen .................. G06F 17/30976 455/466 |
| 2011/0113287 A1 | | 5/2011 | Gururaj |
| 2011/0314011 A1 | | 12/2011 | Buehrer et al. |
| 2013/0159007 A1 | | 6/2013 | Brosche et al. |
| 2013/0290786 A1 | | 10/2013 | Artzi et al. |
| 2013/0332905 A1 | | 12/2013 | Vikutan et al. |
| 2015/0039943 A1 | | 2/2015 | Sweis |
| 2015/0286560 A1 | | 10/2015 | Michelsen |
| 2016/0162398 A1 | | 6/2016 | Shabazz et al. |

OTHER PUBLICATIONS

International Search Report and Written Opinion for International Patent Application No. PCT/US2016/046095, dated Nov. 17, 2016, date of filing: Aug. 9, 2016, 12 pages.

Amendment for U.S. Appl. No. 14/695,683 dated Nov. 11, 2016, 12 pages.

"Assima Training Suite", Published on: Feb. 2, 2014 Available at: http://www.assima.net/us/products/training-suite.

Scott, Judy E., "Post-Implementation Usability of Erp Training Manuals: The User's Perspective", In Proceedings of Information Systems Management, vol. 22, Issue 2, Mar. 2005, 2 pages.

U.S. Appl. No. 62/088,469, Prodan, et al., "On-screen Playback of Recorded Business Process", filed Dec. 5, 2014.

U.S. Appl. No. 62/088,476; Bondarenko, et al., "Automatic Business Process Recording and Documentation", filed Dec. 5, 2014.

U.S. Appl. No. 62/088,472, Bondarenko, et al., "Imperative Test Generation from Business Process Recording IDF", filed Dec. 5, 2014.

Final Office Action for U.S. Appl. No. 14/695,683 dated Feb. 7, 2017, 13 pages.

Second Written Opinion for International Patent Application No. PCT/US2016/046095 dated Mar. 8, 2017, Filing date: Aug. 9, 2016, 7 pages.

Swain, et al., "Test Case Generation Based on Use case and Sequence Diagram", In Proceedings of International Journal of Software Engineering, vol. 3, No. 2, Jul. 2010, pp. 21-52.

"PeopleSoft Accelerator for HP Business Process Testing", Published on: Nov. 2013, Available at: http://h20195.www2.hp.com/v2/GetPDF.aspx%2F4AA4-5190ENW.pdf.

Faria et al.,, "Test Generation from UML Sequence Diagrams", IIn Eighth International Conference on the Quality of Information and Communications Technology, Jun. 2012, 9 pages.

International Search Report and Written Opinion for International Patent Application No. PCT/US2015/061767, dated Jun. 3, 2016, date of filing: Nov. 20, 2015, 13 pages.

Ostrand et al: "A Visual Test Development Environment for GUI Systems", Software Engineering Notes, ACM, vol. 23, No. 2, Mar. 1, 1998, 12 pages.

Non-Final Office Action for U.S. Appl. No. 14/695,683 dated Sep. 8, 2016, 12 pages.

International Preliminary Report on Patentability for International Patent Application No. PCT/US2016/046095, dated Jun. 8, 2017, date of filing: Aug. 9, 2016, 8 pages.

"Second Written Opinion Issued in PCT Application No. PCT/US2015/061767", dated Nov. 29, 2016, 6 Pages.

* cited by examiner

AUTOMATIC PROCESS GUIDANCE

CROSS-REFERENCE TO RELATED APPLICATION

The present application is based on and claims the benefit of U.S. provisional patent application Ser. No. 62/212,927, filed Sep. 1, 2015, and also claims the benefit of U.S. provisional patent application Ser. No. 62/088,472, filed Dec. 5, 2014, and U.S. patent application Ser. No. 14/695,683, filed Apr. 24, 2015, the content of which is hereby incorporated by reference in its entirety.

BACKGROUND

Computer systems are currently in wide use. Many computer systems are controlled by various processes.

By way of example, computer systems can be used to control a wide variety of things. Computer systems can be used to control automotive vehicles, aircraft, industrial processing systems, and even the operation of organizations. Such computer systems can be deployed, for instance, in vehicles or aircraft as control systems. They can be deployed at industrial processing facilities as industrial control applications. They can also be deployed in organizations as enterprise resource planning systems, customer relations management systems, etc.

Such computer systems are often controlled by various processes. Some processes can include human involvement. For instance, a vehicle control computing system can sense human interactions with the system and control a vehicle based on those interactions. By way of example, a vehicle may sense that a user has entered the vehicle and actuated the ignition switch. These sensed interactions can be used to control the vehicle.

In some computer systems, it can be difficult to ensure that a relatively new or inexperienced user is interacting with the computer system in the proper way. For example, in some large industrial vehicles, a user must perform certain interactions, in a given sequence, in order for the machine to become operable. By way of example, if a user wishes to operate a skid steer loader, the user must normally enter the loader, and then perform a variety of interactions, in some given sequence (such as placing the loader in neutral, lowering a seat bar or fastening a seatbelt) in order to control an interlock system to render the loader operable.

The discussion above is merely provided for general background information and is not intended to be used as an aid in determining the scope of the claimed subject matter.

SUMMARY

User interactions with a computing system are sensed and recorded. The recording represents a process for controlling a computer system. Voice input are received and the computer system actions are taken based upon the voice inputs and a task recording.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
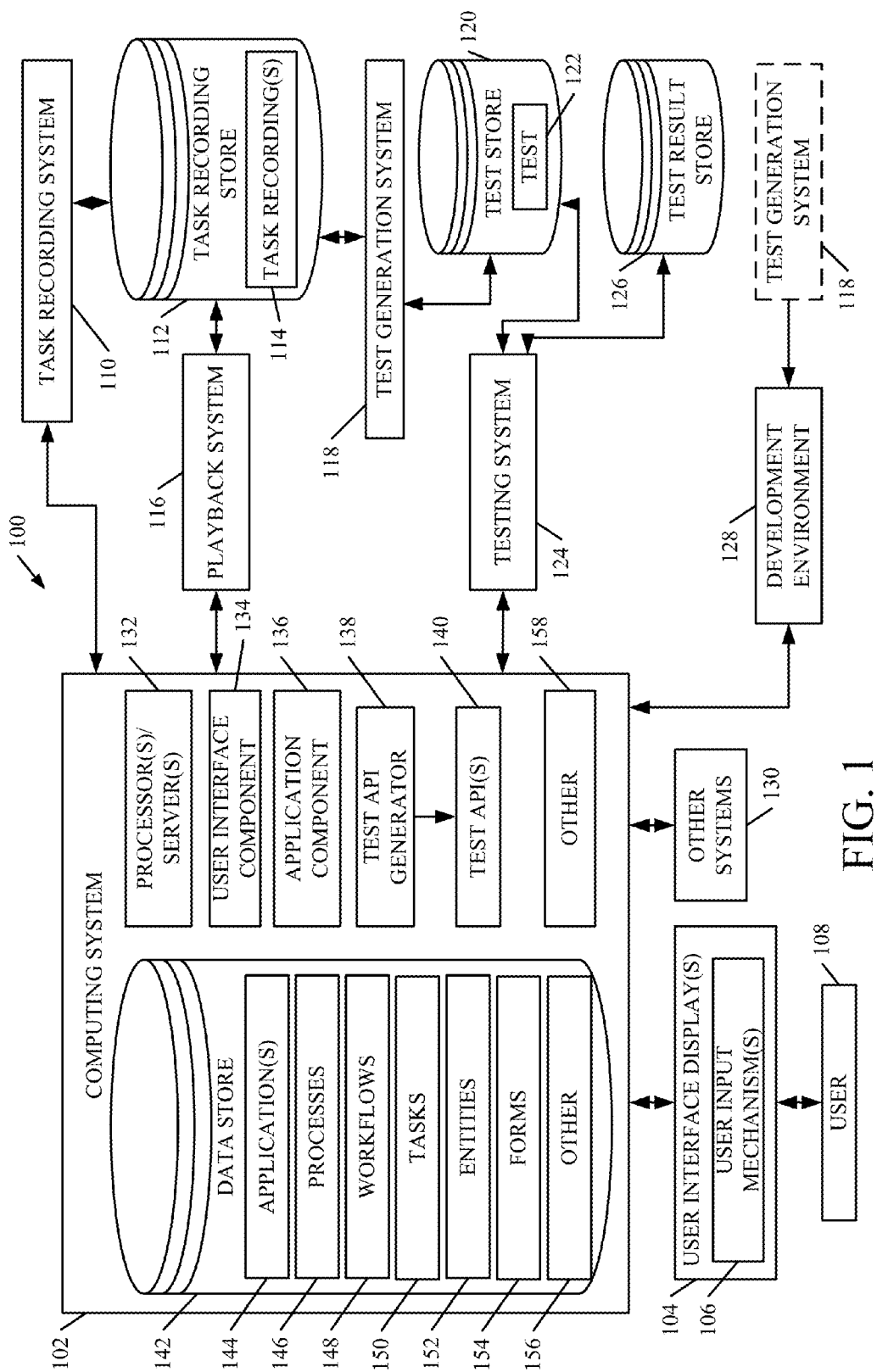
FIG. 1 is a block diagram of one example of a recording system architecture.

FIG. 1 is a block diagram of one example of a recording system architecture 100. Architecture 100 illustratively includes computing system 102 that generates user interface displays 104 with user input mechanisms 106 for interaction by user 108. User 108 illustratively interacts with user input mechanisms 106 in order to control and manipulate computing system 102.

Architecture 100 also illustratively includes task recording system 110, task recording store 112 that stores task recordings 114, playback system 116, test generation system 118, test store 120 that stores tests 122, testing system 124, test result store 126 and development environment 128. Architecture 100 can include other systems 130 as well.

In the example shown in FIG. 1, computing system 102 illustratively includes processors or servers 132, user interface component 134, application component 136, test application programming interface (API) generator 138 that generates test API(s) 140, and it can include other items 158 as well. Data store 142 illustratively includes one or more applications 144, processes 146, work flows 148, tasks 150, entities 152, forms 154, and it can include other items 156. Before describing the operation of each of the items in architecture 100 in more detail, a brief overview will first be provided.

Computing system 102 can be a wide variety of different types of computing systems. In one example, it senses user interactions with computing system 102, by user 108, in performing a task or process relative to computing system 102, and controls its operation based upon the sensed inputs. As an example, where computing system 102 is a computing system that controls a piece of machinery, it senses user interactions by user 108 and controls the machinery based upon those interactions. Where it is an industrial control application, it controls the operation of an industrial processing facility based upon sensed user interactions, as well as various other sensed parameters. Where it is a customer relations management or enterprise resource planning system, it controls operations of an organization or a computing system deployed by an organization based upon the sensed user interactions by user 108.

Application component 136 illustratively runs one or more applications 144 that, themselves, can implement processes, workflows, tasks, or other items. The applications 144 can also operate on entities 152 or other data records 156. They can surface information for user 108, or other systems 130, or for any of the other systems shown in architecture 100, using forms 154 or other user interface displays or surfacing mechanisms. Test API generator 136 illustratively generates test APIs 140 that can be used to interact with forms 154 or other user interface display mechanisms in the various applications 144 of computing system 102. In one example, the test APIs 140 are strongly typed APIs so that static type checking can be performed on them during compile time.

In one example, user 108 (or another user) can invoke task recording system 110 in order to record a process or tasks performed within computing system 102. System 110 illustratively records the various steps in the process or task, along with the consequences of those steps within computing system 102, and stores them as a task recording 114.

By way of example, if the user 108 interacts with a given user input mechanism 106, task recording system 110 not only records that the user has interacted with that user input mechanism, but it also records what happens as a result of that user interaction. This type of causal information is stored as part of the task recording 114 for the task being recorded.

The task recording 114 can then be accessed by playback system 116. Playback system 116 can play back the recorded task against API(s) 140 to actually control computing system 102 to perform the task automatically. It can also play back the recording in a tutorial mode which can be viewed by user 108 so that user 108 can more quickly learn the tasks that were performed as part of the recorded process. It can further play back the task recording 114 in a user driven mode where the playback guides the user to take the steps in the process or task, but the user actually takes those steps instead of playback system 116 automatically performing the steps.

Test generation system 118 illustratively accesses task recordings 114 and automatically generates tests 122 that can be stored in test store 120. Testing system 124 can access the tests 122 and run them against computing system 102 to determine whether computing system 102 is performing properly. Testing system 124 illustratively stores the test results in store 126 for later use by other systems 130, user 108, a developer that uses development environment 128, or otherwise. In running the tests, testing system 124 illustratively interacts with the user input mechanisms 106 through test APIs 140 that are generated for forms 154 or other user interface displays.

Development environment 128 can also deploy test generation system 118. It can be used by a developer to further refine the tests that were automatically generated, to add comments to the tests, to modify the task recordings 114, or to perform other development activities.

Figure 2:
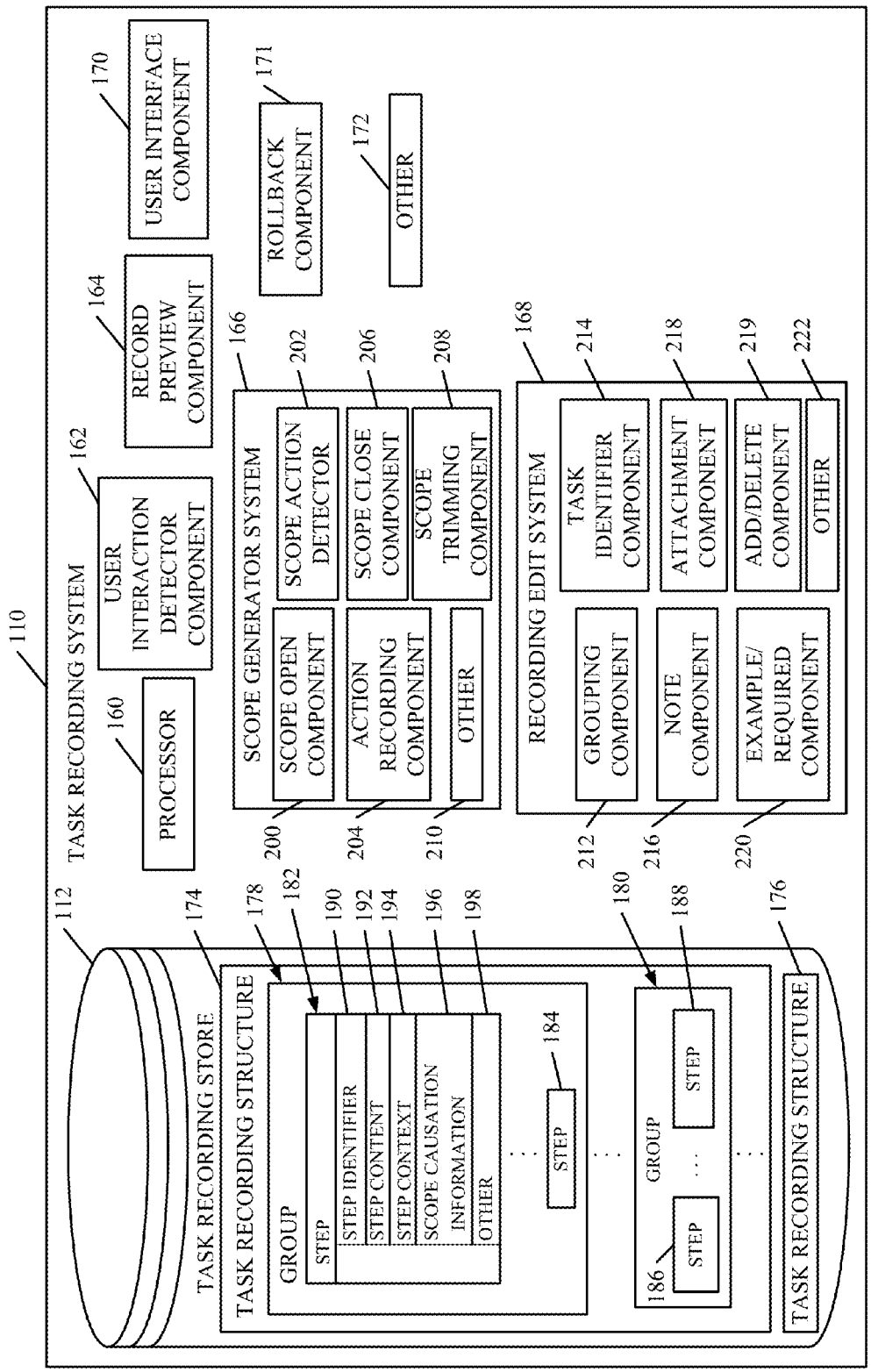
FIG. 2 is a more detailed block diagram of one example of a task recording system.

FIG. 2 is a more detailed block diagram of one example of task recording system 110. In the example shown in FIG. 2, task recording system 110 illustratively includes one or more processors or servers 160, task recording store 112 (although this can be separate from task recording system 110 as well), user interaction detector component 162, record preview component 164, scope generator system 166, recording edit system 168, user interface component 170, rollback component 171 and it can include other items 172.

In the example shown in FIG. 2, task recording store 112 includes a set of task recording structures 174-176. The set of task recording structures 174-176 in task recording store 112 are each illustratively formed of a set of groups 178-180. Each group includes a plurality of different steps. For instance, group 178 illustratively includes steps 182-184. Group 180 illustratively includes steps 186-188. Each step illustratively represents a sensed user interaction with computing system 102. Each step in task recording structure 174 thus stores a variety of different types of information that identify the particular sensed user interaction that it represents. It can illustratively include, for instance, a step identifier 190, step content information 192, step context information 194, scope (causation) information 196, and it can include other information 198.

Step identifier 190 illustratively identifies the particular step that was detected. For instance, the step identifier can indicate that the user interacted with a particular input mechanism. Step content 192 illustratively identifies a variety of different types of content corresponding to the step. For instance, if the user actuated a user input mechanism to open a form, step content 192 may illustratively identify the particular form that was opened. Content 192 can also identify information that was input by the user during the interaction, among other things. Step context 194 illustratively identifies the context of the application (or other context information) surrounding the detected step. For instance, if the user is actuating a certain user input mechanism, the context may indicate the previous user interface display that the user used to navigate to the current user input mechanism. Scope information 196 illustratively identifies various actions or other things that happened within the application, within the scope of the current step. This is described in greater detail below with respect to scope generator system 166. The step information 182 is illustratively generated for each step, and the steps 182-184 are arranged in the sequence in which they were taken (or detected).

Task recording structure 174 can also be a hierarchical structure. For instance, within a given group 178, a particular step 182 may open a given form for the user. Then, within that form, the user may actuate a certain user input mechanism. In that case, the action that was detected to open the form will be entered into group 178 as a parent node in a hierarchical structure. The step that was detected to actuate the user input mechanism within the given form can be stored as a child node, that depends from the parent node. In this way, certain contextual information can be identified, simply based upon the hierarchical structure. If a node is a child of a parent node, then the detected action corresponding to the child node can be identified as being within the context of the parent node. Context information can be identified in other ways as well.

Scope generator 166 illustratively includes scope open component 200, scope action detector 202, action recording component 204, scope close component 206, scope trimming component 208, and it can include other items 210. Scope generation system 166 illustratively opens a scope corresponding to each detected or sensed user interaction. It records everything that happens within the application (or within computing system 102) or both, during that scope. When processing of the sensed user interaction is completed, then the scope is closed. The scope information recorded can illustratively be interpreted as causation information.

By way of example, if the detected user interaction is to open a form, then a scope would be opened around that user interaction. The next thing to happen within the application is that the application might open and display the selected form. This will also be recorded as scope information. It can thus be seen that, because the user actuated a user input mechanism to open a form, this caused the system to open the identified form. Similarly, for example, if the application displays an error message in response to a detected user interaction with a given user input mechanism, then it can be determined that the error message was displayed because the user interacted with the given user input mechanism. Of course, the error message may have other causes as well, but at least one of the causes was that the user interacted with the particular user input mechanism as recorded.

In order to record scope information for a given user interaction (or step) Scope open component 200 illustratively opens a scope 196 for a given step 182, once that step is detected. Scope action detector 202 detects the various actions which the application or computing system take while the scope is open. Action recording component 204 records all of the detected actions, and scope close component 206 closes the scope once processing for the detected action has been completed. It may be that some of the actions or things recorded by action recording component 204, during a given scope, are unwanted. In that case, scope trimming component 208 can trim unwanted items from the scope, after it is closed.

Recording edit system 168 illustratively includes grouping component 212, task identifier component 214, note component 216, attachment component 218, examples/required component 220, and it can include other items 222. Edit system 168 can be used by a given user in order to edit or provide other authoring inputs either as a task recording is being generated, or after it has been generated. It may be, for instance, that the user wishes to group certain user interactions into groups corresponding to a given task or a set of steps. Thus, task identifier component 214 can be used to provide identifying information to identify that group of steps, and grouping component 212 illustratively generates user input mechanisms that can be actuated in order to group detected steps or user interactions into groups. It may also be that the user wishes to add certain information to a step, a task, a group, etc. Note component 216 illustratively displays user input mechanisms that allow the user to enter notes or additional explanatory material corresponding to a step, group or task. Attachment component 218 illustratively displays user input mechanisms that can be actuated to allow the user to attach documents, videos, or other attachments, to a recorded step, in line in the task recording. When the task recording is later played back, the notes and attachments are indicated so that the user viewing the playback can access them.

Example/required component 220 illustratively allows the user to indicate whether a particular value entered during a step is required or is simply an example. By way of example, if a given detected user interaction is to actuate a user input mechanism that displays a dropdown menu, and a next user interaction is to select a value from the dropdown menu, it may be that the author of the task recording wishes subsequent users to select that same item from the dropdown menu, every time. Alternatively, it may be that the author of the task recording simply wants the subsequent user to select any value from the dropdown menu, and the selected value may not necessarily need to be the same one that was selected during the task recording. In the former case, component 220 illustratively generates user input mechanisms that can be actuated by the user to indicate that the detected action is only an example. In the latter case, the user input mechanisms can be actuated to indicate that the detected user interaction is mandatory or required. Of course, this is only one example of the component 220.

Figure 2A:
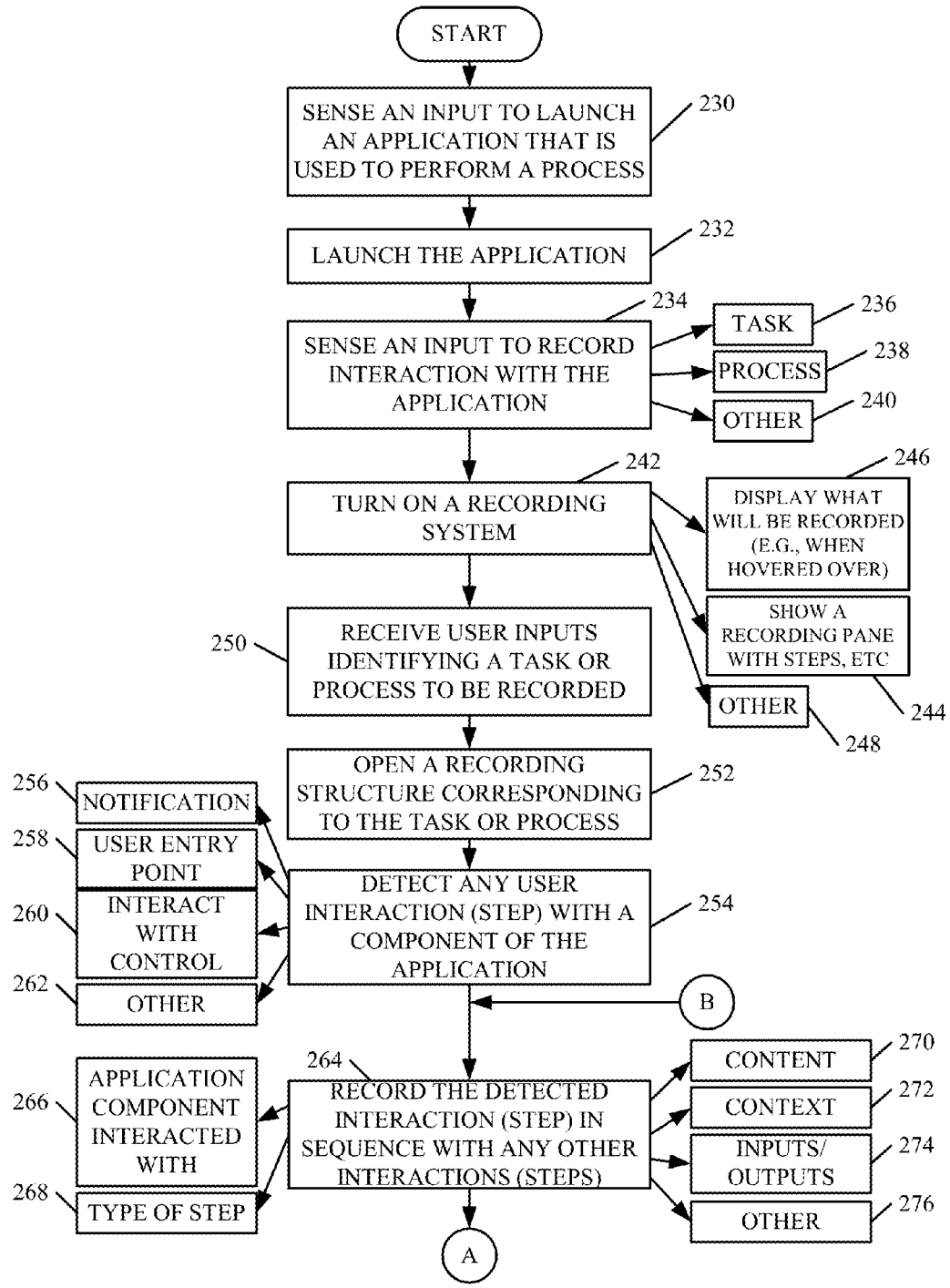
FIGS. 2A-2C show a flow diagram illustrating one example of the operation of the task recording system shown in FIG. 2.
Figure 2B:
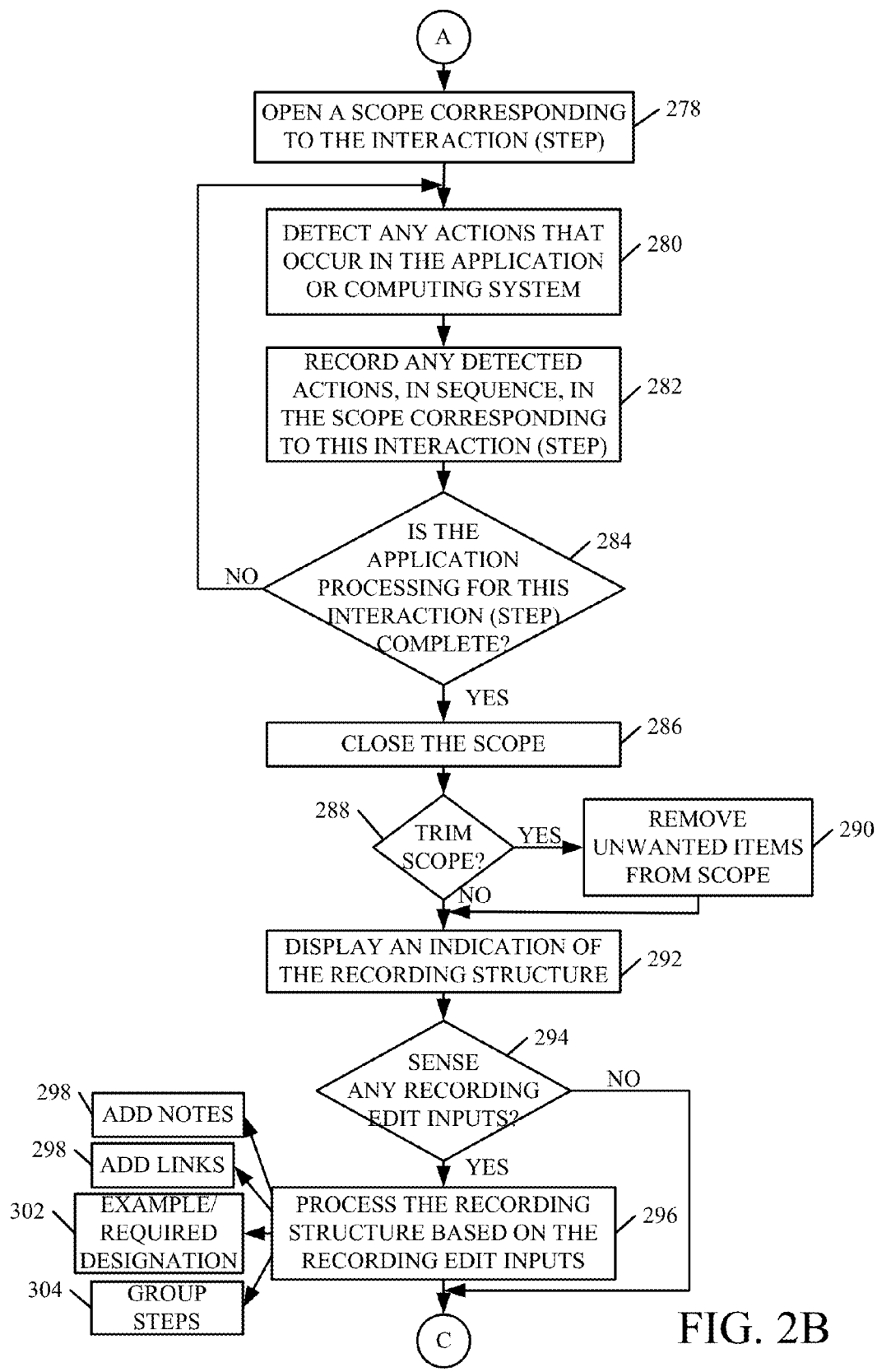
Figure 2C:
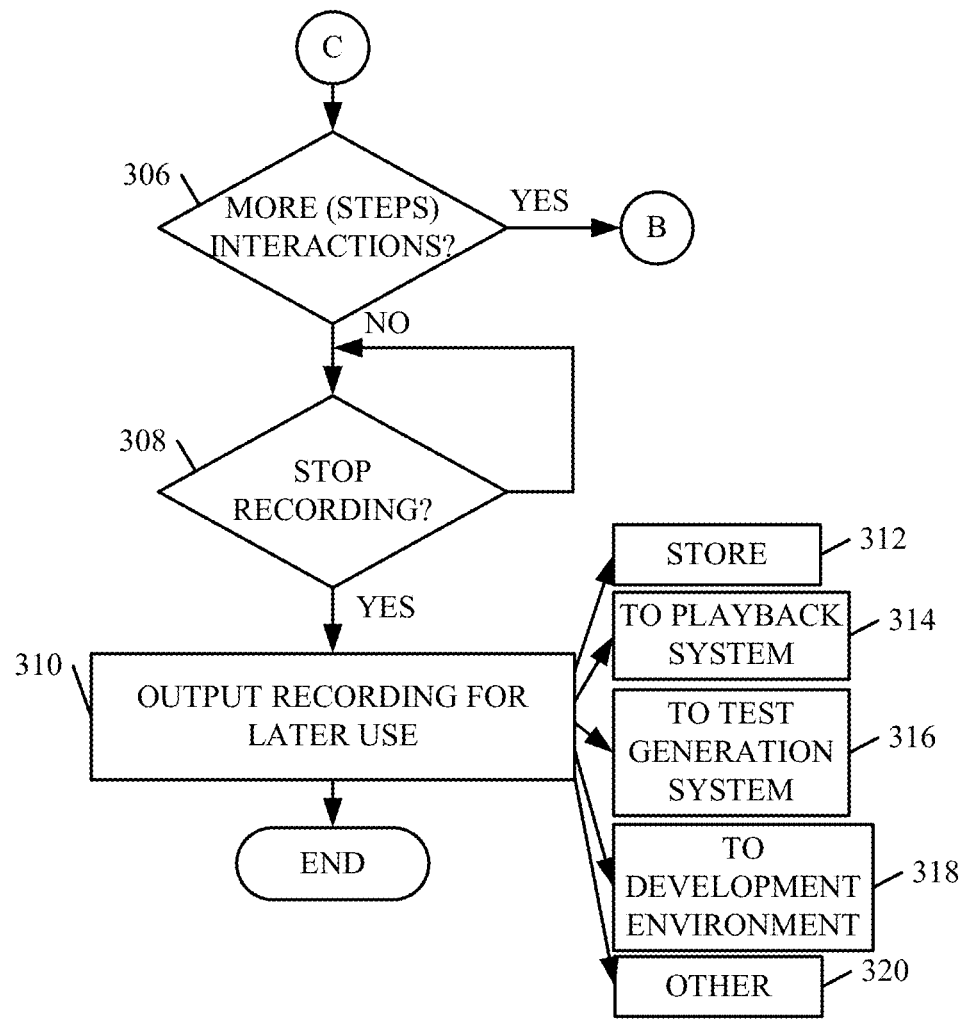

FIGS. 2A-2C show a flow diagram illustrating one example of the operation of task recording system 110, shown in FIG. 2. It is first assumed that user 108 (or another user) provides an input to launch an application 144 that is used to perform a process or otherwise control computing system 102. Sensing that user interaction input is indicated by block 230 in FIG. 2A. Application component 136 then launches the application, as indicated by block 232.

At some point, user 108 will illustratively interact with the application through user input mechanisms 106. One such user input interaction will be an indication that the user wishes task recording system 110 to record a set of steps (e.g., a task or process). Sensing such a user interaction input is indicated by block 234. Sensing an input to record a task is indicated by block 236. Sensing an input to record a process is indicated by block 238. Sensing an input to record another item is indicated by block 240. For purposes of the present discussion, it will be assumed that computing system 102 has sensed that the user has provided an input to record a task or process.

Computing system 102 then turns on recording system 110. This is indicated by block 242. When task recording system 110 is turned on, in one example, it illustratively displays a recording pane that has user actuatable input mechanisms that can be actuated in order to control the recording, such as to stop, pause, start, etc. This is indicated by block 244. In another example, once task recording system 110 has been started, preview component 164 provides a visual indication to the user indicating which steps or user interactions will be recorded by system 110. For instance, in one example, the application 144 that is running, and for which the user wishes to record a task, may display a user interface display that has certain user input mechanisms that can be actuated in order to take actions within the application. In one example, as the user hovers a cursor or other item over the user input mechanisms, preview component 164 provides a visual indication indicating whether user actuation of the corresponding input mechanism will be recorded as a step. For instance, it may be that component 164 highlights the user input mechanism (by bolding it, shading it, etc.) to indicate whether it will be recorded as a step in the task or process being recorded. This is indicated by block 246. It will of course be noted that task recording system 110 or preview component 164 can perform other actions, once it is turned on, and this is indicated by block 248.

In one example, the recording pane displayed by task recording system 110 illustratively includes user input mechanisms that allow the user to provide inputs identifying the task or process to be recorded. For instance, the user input mechanisms can include a text box that allow the user to type text to give the task recording or process recording a name. The user can illustratively provide other identifying information as well. Receiving user inputs identifying a task or process to be recorded is indicated by block 250 in FIG. 2A.

In one example, task recording system 110 illustratively opens a task recording structure 174 (shown in FIG. 2) for the task recording about to be generated. Opening the task recording structure is indicated by block 252 in FIG. 2A. Task recording system 110 is then ready to record a task or process.

Figure 2D:
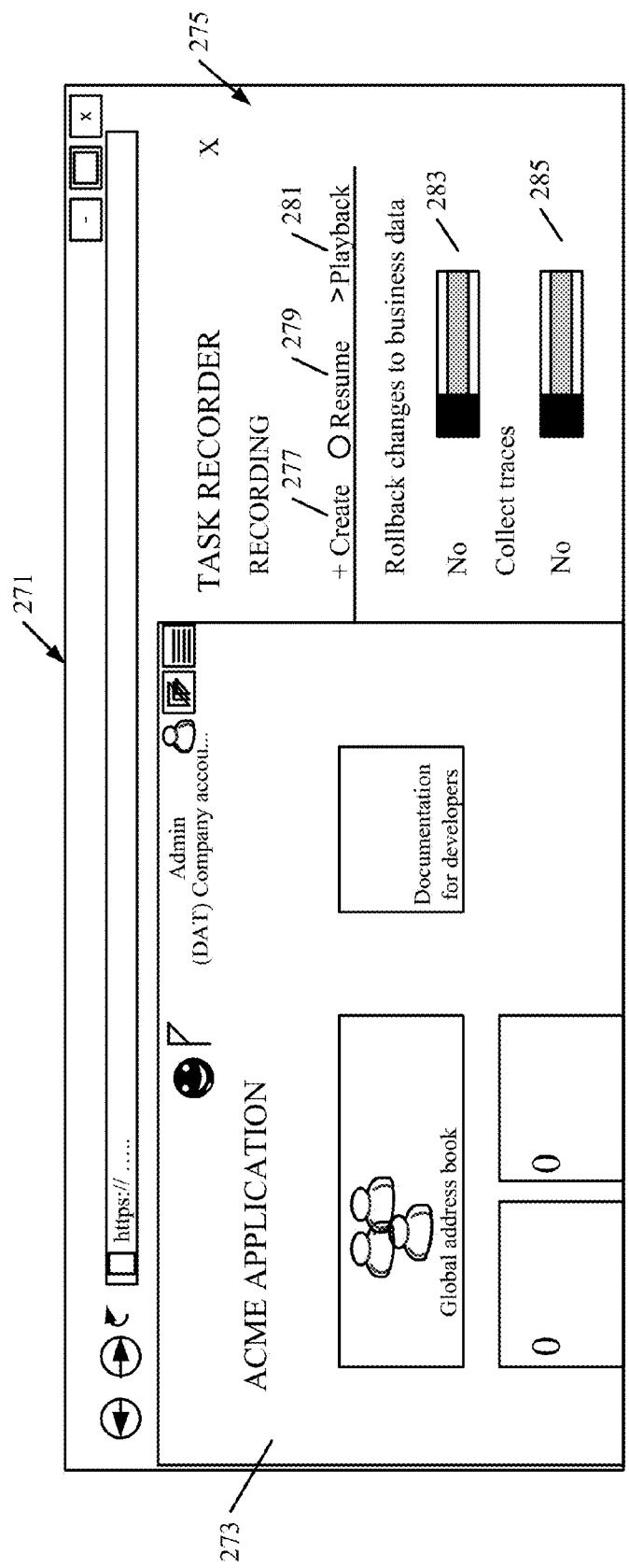
FIGS. 2D-2F show examples of user interface displays.

FIG. 2D, for instance, shows an example of a user interface display 271. Display 271 illustratively includes an application pane 273 and a task recorder pane 275. Application pane 273 displays information and controls for an open application, and for which a set of user interactions are to be recorded as a task. Task recorder pane 275 illustratively includes a set of user input mechanisms that can be actuated to control task recording system 110.

For instance, the user input mechanisms can include a create mechanism 277 that can be actuated to create a new task recording. When it is actuated, it navigates the user through a set of user interface displays that allow the user to create a new recording.

The user input mechanisms can also include a resume mechanism 279. Mechanism 279 can be actuated to resume a task recording that has already been created.

The mechanisms can also include a playback mechanism 281 that can be actuated to invoke the playback system 116. This is described in greater detail below with respect to FIGS. 3-3D.

The mechanisms on pane 275 can also include rollback mechanism 283 and collect traces mechanism 286. When mechanism 283 is turned on, then the rollback component 171 rolls back all changes made to the application during recording of the task, once the recording is completed. This can be done, for instance, by creating a database transaction that is aborted when the user stops the recording. It can be done in other ways as well. Rolling back the changes can be useful in a variety of ways. For instance, when the user is recording multiple recordings in succession, the subsequent recordings may be undesirably impacted by the changes made in the earlier recordings. This may result in confusion when the recordings are played back.

When mechanism 285 is turned on, the system illustratively collects event traces during the recording. These can be made available with the recording, or separately.

Figure 2E:
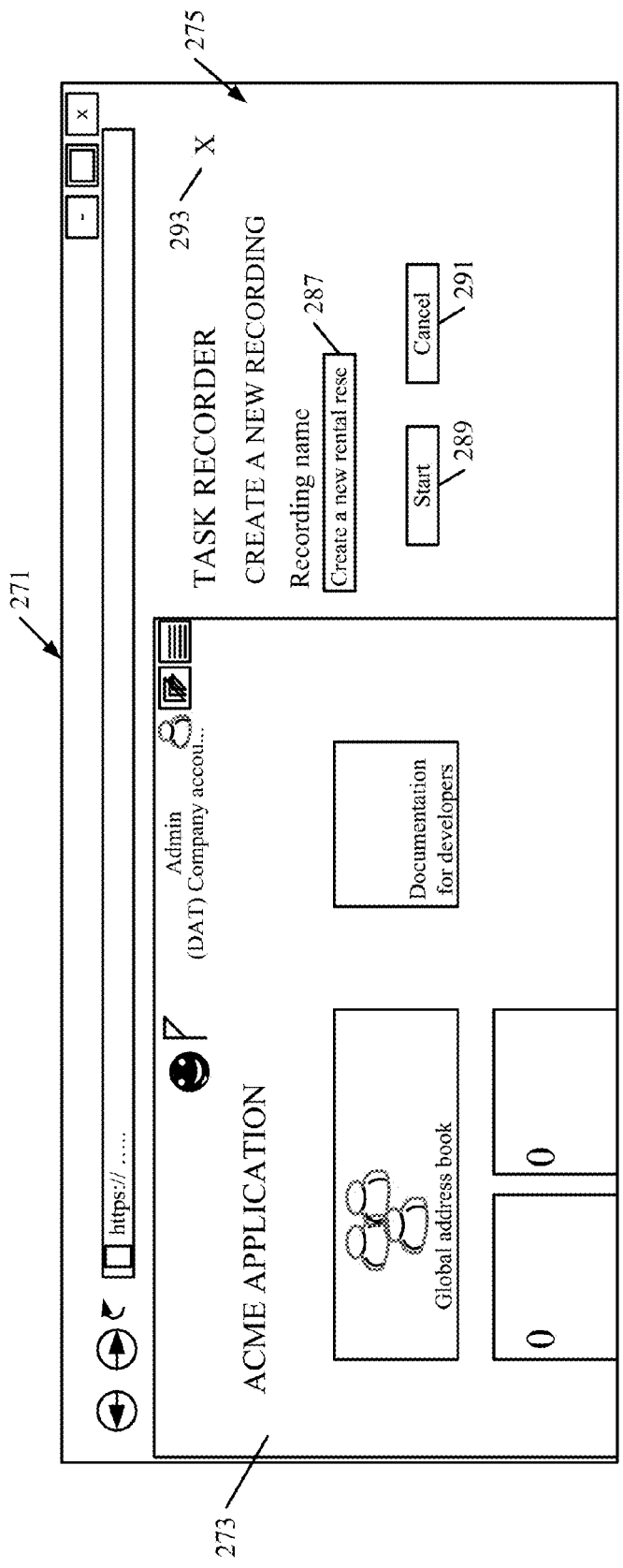

FIG. 2E shows an example of user interface display 271 after the user has actuated mechanism 277 to create a new task recording. It can be seen that task recorder pane 275 now includes a name user input mechanism 287 that can be actuated by the user to enter a name for the task to be recorded. The user can actuate start mechanism 289 to begin the task recording, cancel mechanism 291 to cancel it and stop mechanism 293 to end the task recording.

At some point, user 108 will interact with a user input mechanism 106 generated by the application for which the task or process is to be recorded. When that happens, user interaction detector component 162 (shown in FIG. 2) detects the user interaction input (e.g., it detects the step taken by the user) with a component of the application 144 that is currently running. Detecting the user interaction (or step) is indicated by block 254 in FIG. 2A. User interaction detector component 162 can detect this in a variety of different ways. For instance, it can register to receive notifications 256 that indicate when the particular user input mechanisms have been actuated or otherwise interacted with. It can also identify other user entry points into the application 144, for which detector component 162 wishes to be notified. This is indicated by block 258. It can also simply detect user interaction with a control, as indicated by block 260, or it can detect any user interaction (or step) in other ways as well, and this is indicated by block 262.

Once the user interaction input is detected, component 162 also records the detected user interaction (or step) in the corresponding task recording structure 174 that is open for this task, and in sequence with any other user interactions (or steps) that have already been detected. This is indicated by block 264 in FIG. 2A. By way of example, it can record the identity of the particular application component (in application 144) that was interacted with based on the user interaction. This is indicated by block 266. It can record the type of step or interaction that was taken (such as open a form, actuate a button, click a link, etc.). Identifying the type of step is indicated by block 268. It can also take a screenshot of a browser and store that as well. It can convert the screenshot into a word processing document or store it in any other desired format. It can record a variety of other content such as the particular identity of the form to be opened, the identity of the control actuated, etc. This is indicated by block 270. It can record current context information, such as how the user arrived at the user input mechanism in the first place, the context of the particular application 144 being run, the screen, form or other user interface display that is currently being displayed with the user input mechanism that was interacted with, etc. This is indicated by block 272. It can also record any particular data that is input by the user or output by the system. This is indicated by block 274. It can record other items based on the detected user interaction (or step) as well, and this is indicated by block 276.

Once the initial step information is recorded, in sequence, in the corresponding task recording data structure, scope open component 200 opens a scope, in memory, corresponding to the interaction (or step) that was just detected. This is indicated by block 278. Scope action detector 202 then detects any actions taken by application 144, computing system 102, or any other processing components or other components in computing system 102, in response to the user interaction detected. Detecting these actions is indicated by block 280. Action recording component 204 then records all of those detected actions, in sequence, in the scope corresponding to this interaction (or step). This is indicated by block 282. Scope generator 166 continues to detect actions and record those actions, within the present scope, until the application processing for the detected user interaction (or step) has been completed. This is indicated by block 284. Once that processing has been completed, then scope close component 206 detects this and closes the scope. This is indicated by block 286.

In one example, scope trimming component 208 can then trim any undesired information from the scope that has just been closed. For instance, it may be that a given user who is authoring a task recording only wishes certain information to be recorded in the scope, and regards other actions as obfuscating the desired information. Thus, the user can configure scope trimming component 208 to trim all information, other than that desired, from the scope. Of course, component 208 can be preconfigured to do this as well. In any case, if component 208 is to trim items from the scope, it removes them from the corresponding scope before the task recording is finalized. This is indicated by blocks 288 and 290 in FIG. 2B.

It can thus be seen that, once a scope is closed, it illustratively includes causal information. The causal information indicates actions which were caused in response to the detected user interaction (or step).

Also, in accordance with one example, user interface component 170 in task recording system 110 illustratively displays, on a display pane or other user interface display, an indication of the task recording structure 174 being formed for the current task recording. In one example, that indication includes a list of steps that have been detected, in sequence. Recording edit system 168 can also illustratively display user input mechanisms that allow the author of the task recording to edit the task recording in certain ways. For instance, recording edit system 168 can sense user interactions with those user input mechanisms to perform various edits on the task recording. Displaying the indication of the recording structure and sensing edit inputs are indicated by blocks 292 and 294 in FIG. 2B, respectively.

If edit inputs are sensed, then recording edit system 168 illustratively processes the recording structure to reflect those recording edit inputs. This is indicated by block 296. For instance, task identifier component 214 can display a user input mechanism that allows the user to name or otherwise identify the task recording being generated. Grouping component 212 illustratively generates user input mechanisms that allow the user to group steps (or detected user interactions) into groups. This can be helpful because some processes have hundreds or thousands of steps. By allowing the author of the task recording to group those steps into groups, and then to name the groups, this can provide significant efficiencies both to the user viewing a playback, and to the playback system, itself.

Referring to FIG. 2B, note component 216 illustratively generates user input mechanisms that allow the user to add notes to a step, or other parts of the task recording structure. This is indicated by block 298. Attachment component 218 illustratively generates user input mechanisms that allow the user to add attachments, links or other attachments, etc. This is indicated by block 300. Examples/required component 220, as discussed above, illustratively allows the user to mark an entered value or an action as required or simply as an example. This is indicated by block 302. Grouping component 212 allows the user to group steps into groups. This is indicated by block 304.

In one example, add/delete component 219 also generates user input mechanisms that allow the user to add or delete steps or other information relative to the task recording. For instance, the user can even add steps that were not recorded or that are not recordable. The user may add a step such as "now go check the warehouse for inventory." This is an unrecordable step that can be added using component 219. It is only one example.

Figure 2F:
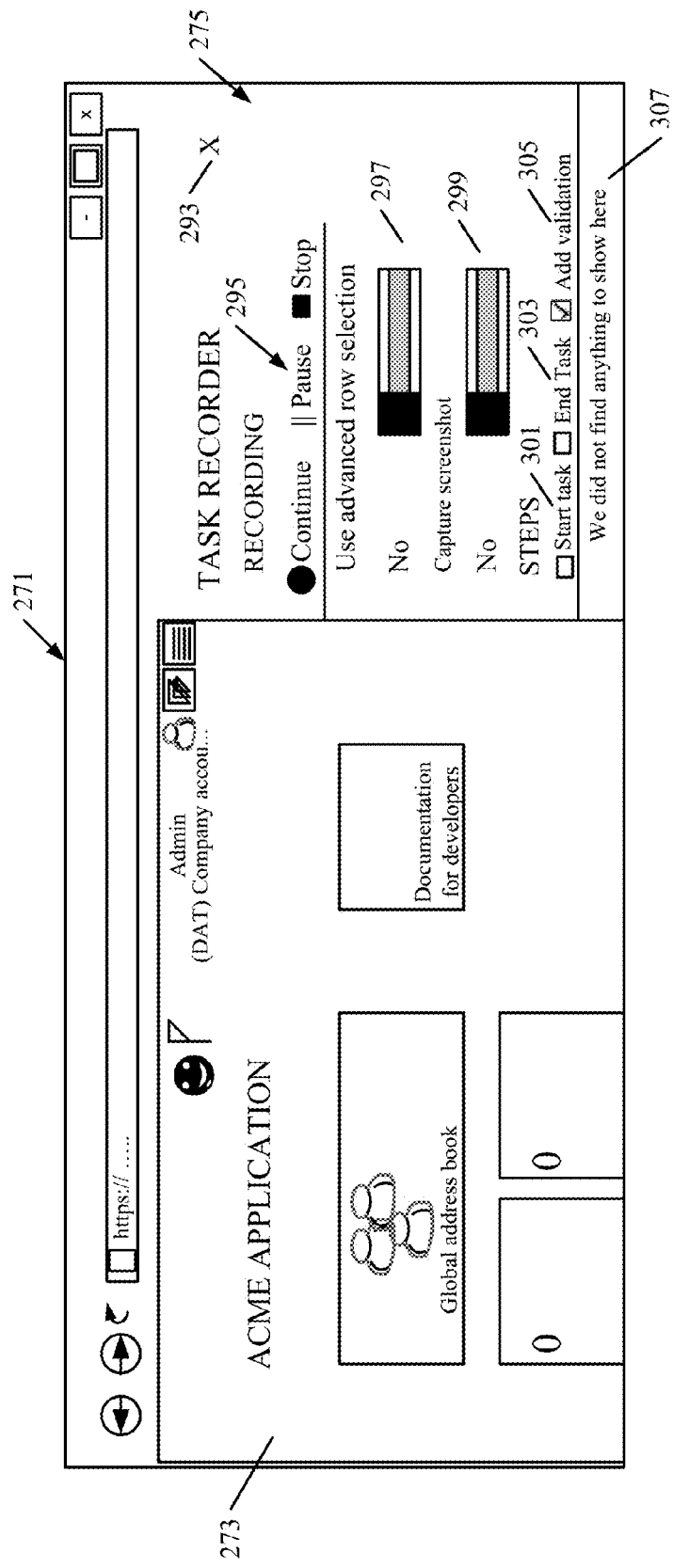

FIG. 2F shows another example of user interface display 271 after the user has actuated user input mechanism 289 to start the task recording. Task recorder pane 275 now includes a set of control mechanisms 295 that allow the user to continue a paused recording, pause a running recording and conclude or stop a recording. When the pause mechanism is actuated, the user can take steps in the application without those steps being recorded.

Pane 275 can also include a row selection user input mechanism. It can be turned on to allow a user to perform advanced row selection or filtering in a grid.

Pane 275 can also include mechanism 299. When it is turned on, then screen shots are captured during the recording as well as the other information discussed herein.

Pane 275 can also include mechanisms 301 and 303. They can be actuated to group steps in a task into groups. For instance, mechanism 301 can be actuated to start a new group of steps, and mechanism 303 can be actuated to end that group.

Validation mechanism 305 can be actuated to add a validation. This is discussed below with respect to FIG. 3C. It can be done in the development environment or in another environment where a task recording is accessible for editing.

Step display portion 307 illustratively displays the steps that have been recorded thus far for the current task recording, grouped based on user actuation of the grouping mechanisms 301 and 303. In the example shown in FIG. 2F, no steps have yet been recorded.

Once all of the actions are complete for a given step, it may be that user interaction detector component 162 detects more user interactions or steps. If so, processing reverts to block 264. This is indicated by block 306 in FIG. 3C. However, if the user does not perform any more interactions, then task recording system 110 simply waits to receive an input indicating that the task recording is to be concluded. This is indicated by block 308. Once the task recording is completed, it is illustratively output for later use. This is indicated by block 310. For instance, it can be stored in task recording store 112. This is indicated by block 312. It can be output to a tutorial system or another playback system 116. This is indicated by block 314. It can be output to test generation system 118. This is indicated by block 316. It can be output to development environment 128, as indicated by block 318, or it can be output in other ways, as indicated by block 320.

It should also be noted that a number of other gestures can be recorded as well. For instance, when the user uses a copy/paste gesture to set a value for a control, both the copy input and the paste input are recorded as steps. This can be advantageous in some scenarios. For instance, it can be advantageous in test code generation (which is discussed in more detail below). The recording system need not create a parameterized input variable for the control's value, since it is set based on another control's value. In scenarios where a record is created, and an identifier for the record is frequently entered during the recording, the user can repeatedly paste the record identifier, and the task recording system will generate only a single parameterized input variable to represent the record identifier. Thus, changing the input data for a generated test can be made much easier.

It can thus be seen that task recording system 110 illustratively provides an automatic recording of application-specific steps that are sensed as user interactions with the computing system. Because this is performed by task recording system 110, the recording is generated without substantially adding any computing or memory overhead to computing system 102. Also, because user interaction detector component 162 can be configured to detect a wide variety of user interactions, the system is extensible to detect interactions with application components, as new components are added. It also illustratively identifies causation information, automatically, by opening a scope corresponding to each sensed user interaction and recording all processing actions that occur within that scope. The task recording structure thus records how each recorded interaction relates to the steps of the underlying process or task being recorded.

Figure 3:
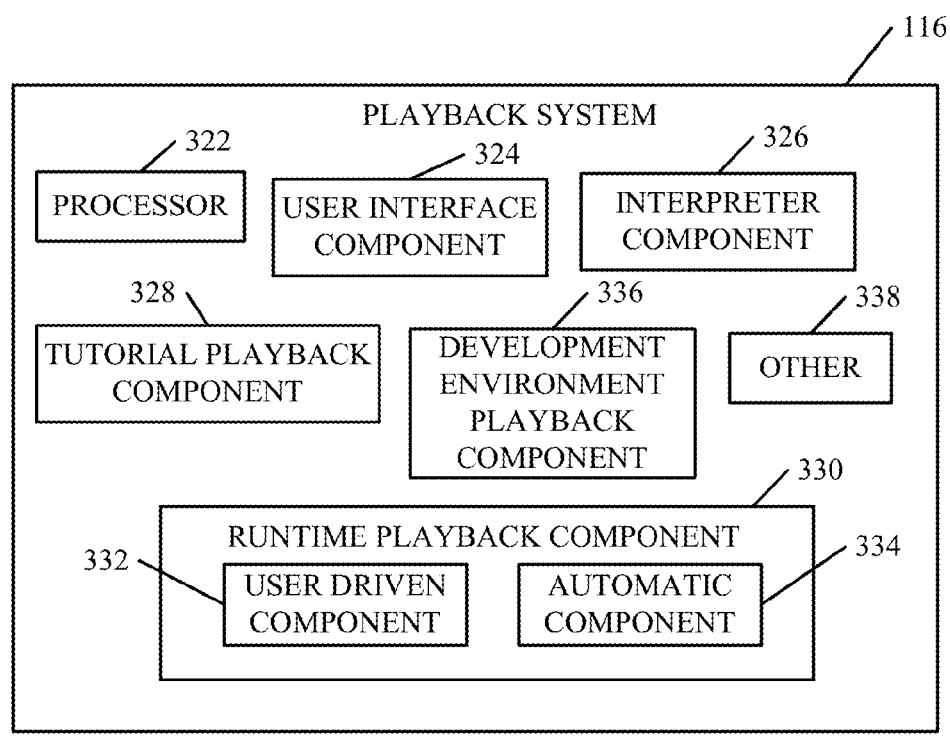
FIG. 3 is a more detailed block diagram of one example of a playback system.

FIG. 3 shows a more detailed block diagram of one example of playback system 116. It will be appreciated that playback system 116 illustratively accesses task recordings 114 in task recording store 112 and plays them back. It can playback task recordings 114 in a variety of different contexts. For instance, system 116 can play them back in a tutorial context in which the recorded steps and corresponding data are simply played back for a user viewing the recording, to teach the user how to perform the steps. System 116 can also play the recording back in a runtime environment in which playback system 116 plays back the recording against a runtime instance of the application and automatically performs the steps in the runtime instance. Also, in the runtime environment, it can play back the recording in a user driven mode in which it visually prompts the user to perform the steps by displaying which user input mechanisms are to be interacted with next, but does not perform the steps automatically against the runtime instance. Instead, it waits for the user to perform a step and then prompts the user to perform the next step. Similarly, system 116 can play back the recordings 114 in a development environment in which the recording 114 can be edited, extended, etc. Thus, in the example shown in FIG. 3, playback system 116 illustratively includes a processor or server 322, user interface component 324, interpreter component 326, tutorial playback component 328, runtime playback component 330 (which, itself, includes user driven component 332 and automatic component 334), and development environment playback component 336. System 116 can include other items 338 as well.

Figure 3A:
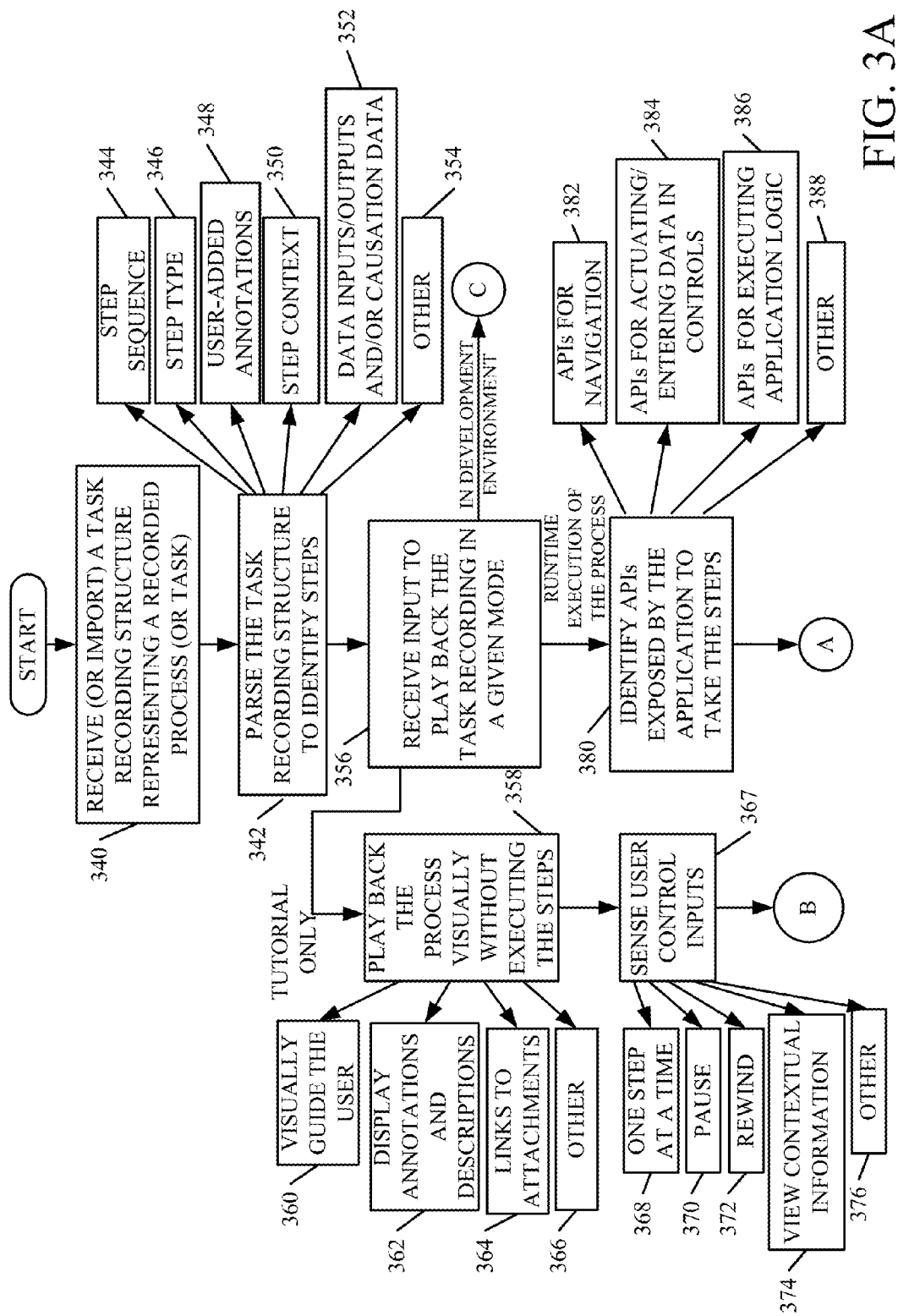
FIGS. 3A-3C show a flow diagram illustrating one example of the operation of the playback system shown in FIG. 3.
Figure 3B:
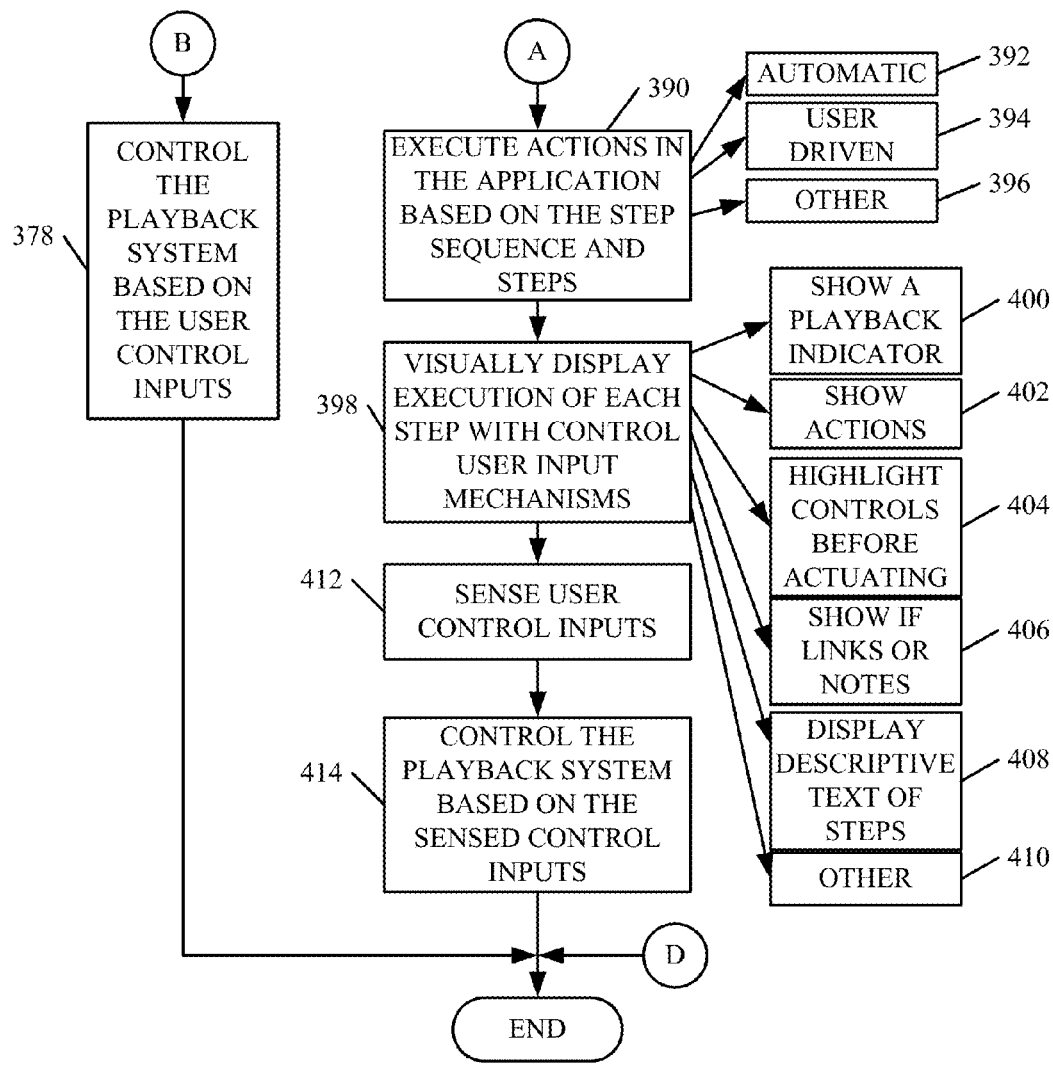
Figure 3C:
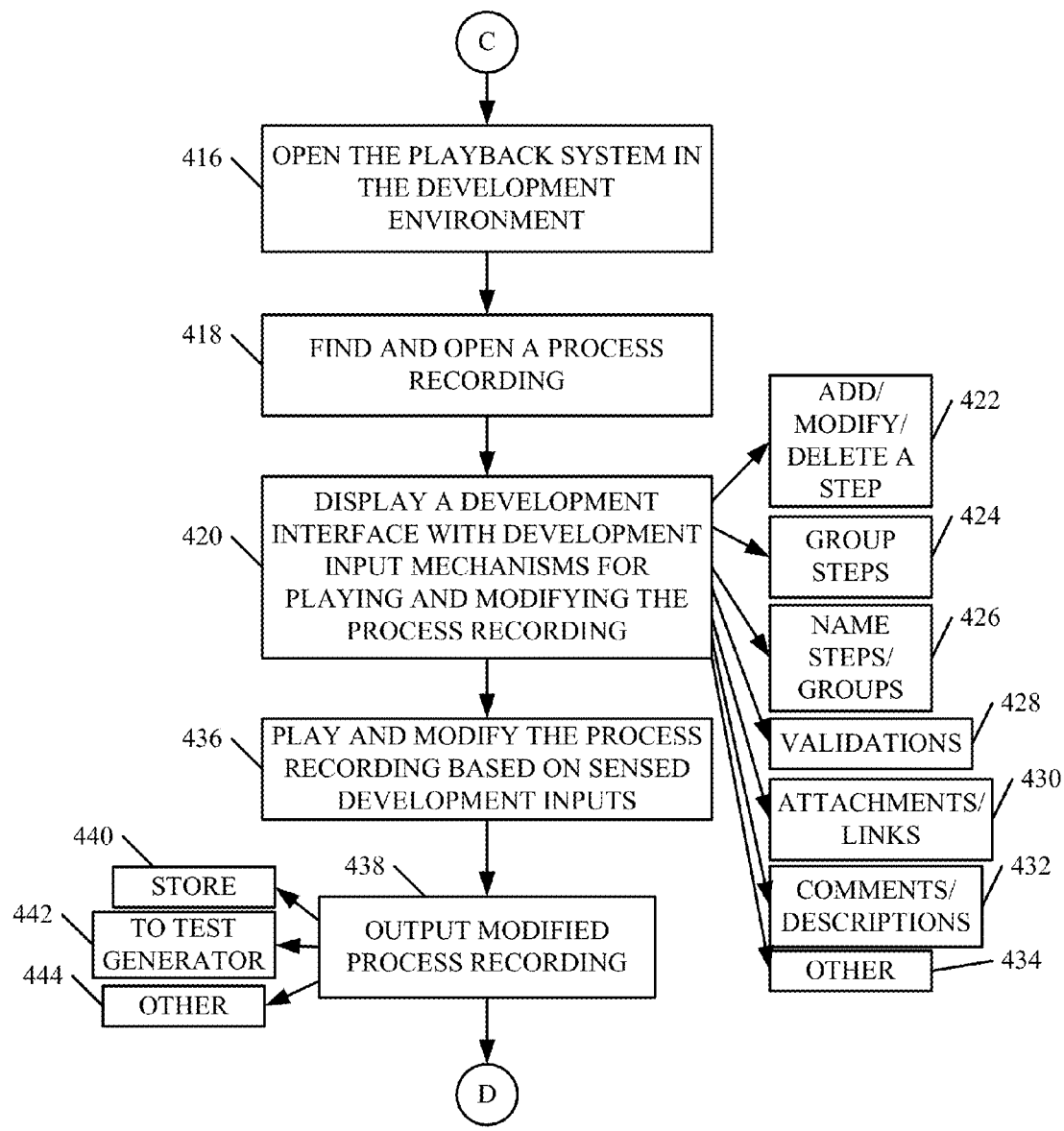

FIGS. 3A and 3B show one example of a flow diagram illustrating the operation of playback system 116. It is first assumed that a user is operating playback system 116 (or it is being operated automatically by another processing system) to receive or import a task recording structure 174 representing a recorded process or task. This is indicated by block 340 in FIG. 3A. By way of example, system 116 can import a task recording 114 from recording store 112. Playback system 116 then receives an input indicating that it is to play back the task recording in a given mode.

Interpreter component 326 then parses the task recording structure to identify the various steps recorded therein. This is indicated by block 342. It can also identify a wide variety of other things in the task recording structure, such as the step sequence 344, the step types corresponding to the steps, as indicated by block 346, and any user added annotations, as indicated by block 348. Further, interpreter component 326 can identify the step context 350, any data inputs or outputs and/or causation data. For instance, it can be directed to play back the task recording in a tutorial mode, in a runtime execution mode, or in a development environment mode. When directed to play back the task recording in a tutorial mode, tutorial playback component 328 generates the playback. In one example, it plays back the process or recorded steps visually, without actually executing those steps in a runtime instance of the application. This is indicated by block 358. This can visually guide the user by highlighting the various user input mechanisms that are actuated, in sequence. This is indicated by block 360. It can display any annotations and descriptions that have been entered by the author, as indicated by block 362. It can provide an indicator indicating that certain steps or interactions have corresponding attachments, such as documentation, video attachments, etc. This is indicated by block 364. It can also play back the recording in other ways, as indicated by block 366.

In one example, user interface component 324 in playback system 116 illustratively also displays a playback control pane that includes user input mechanisms that sense user control inputs that are provided to control the playback. Sensing the user control inputs is indicated by block 366. For instance, the user can provide control inputs to indicate that the system should play back the recording one step at a time, either pausing or stopping between each step so that the user can view additional material. This is indicated by block 368. It can provide input mechanisms that allow the user to pause the recording as is indicated by block 370, to rewind the recording as indicated by block 372, to view contextual information, or other information, as indicated by block 374, or to control the playback in other ways, as well, as indicated by block 376.

In response to sensing the control inputs from the user, tutorial playback component 328 controls the playback based on the user control inputs. This is indicated by block 378.

If, at block 356, playback component 116 is directed to play back the task recording in a runtime environment, then runtime playback component 330 accesses the task recording and plays it back using either user driven component 332 or automatic component 334. In either case, runtime playback component 330 illustratively identifies the APIs exposed by the application, and that are needed to take the steps in the task recording. This is indicated by block 380 in FIG. 3A. The APIs can be for navigation between user interface displays (such as forms, etc.). This is indicated by block 382. They can be APIs used for actuating or entering data into controls. This is indicated by block 384. They can be APIs for executing application logic in the corresponding application. This is indicated by block 386. They can be other APIs as well, as indicated by block 388.

Runtime playback component 330 then executes actions in the application, based upon the steps in the recorded step sequence in the task recording. This is indicated by block 390 in FIG. 3B. For instance, in one example, automatic component 334 automatically executes the actions against the APIs, in order to actually perform the steps within a runtime instance of the application. This is indicated by block 392. In an example, it can do this while visually showing or displaying to the user the steps that are being taken. In one example, the user can also control the playback to pause between steps so that the user can review documentation, annotations, links to attachments, etc. In another example, automatic component 334 simply plays back the steps in the recording, against the runtime instance of the application, without input from the user.

In another example, user driven component 332 illustratively prompts the user to take the actions against the runtime instance of the application. It can do this by highlighting controls to be actuated, by presenting explanatory notes indicating how and why they are to be actuated, data that is to be entered, etc. Playing back the task recording in a user driven way is indicated by block 394. Component 330 can execute actions in the application in other ways as well, and this is indicated by block 396.

As briefly mentioned above, component 330 generates a visual display of the execution of each step, with control user input mechanisms. This is indicated by block 398. For instance, the visual indicator can show a playback indicator indicating that a task recording is currently being played back. This is indicated by block 400. It can show the various actions that are being taken (e.g., the steps) as indicated by block 402, and it can be shown which steps have been taken thus far, and which steps are yet to be taken, in the sequence of steps. It can highlight controls before they are actuated. In this way, it can guide the user's eye to a given user input mechanism and highlight it, and then after a brief period, actuate that control, so that the user can more easily follow the playback. This is indicated by block 404. It can also generate an indicator showing whether there are links or notes associated with a given step or action, as indicated by block 406. It can display descriptive text of the steps or actions as indicated by block 408, and it can visually display other items as well, as indicated by block 410.

In another example, as with the tutorial playback, component 330 can display a control pane with a set of control user input mechanisms that allow the user to control the playback (such as to play back the steps in a step-by-step fashion, to pause between the steps, to rewind, to stop the playback, etc.). This is indicated by block 412. In that case, component 330 controls the playback based upon the sensed control inputs. This is indicated by block 414.

Referring again to block 356, it is now assumed that playback system 116 is to play back the task recording in a development environment. In that case, development environment playback component 336 opens playback system 116 in the development environment 128. This is indicated by block 416 in FIG. 3C. It illustratively displays an exploration window (or other location user interface display) that has user input mechanisms that allows a user of development environment 128 to find and select a process or task recording for playback. This is indicated by block 418.

Development environment playback component 336 then displays a development interface with development input mechanisms for playing and modifying the process recording (or task recording). This is indicated by block 420. For instance, the development interface can illustratively include user input mechanisms that can be actuated to add, modify, delete, or otherwise edit steps in the task recording. This is indicated by block 422. In that case, the steps are illustratively displayed in an editable way, so that they can be edited accordingly.

Component 336 also illustratively displays group user input mechanisms that allow the user to group the steps into groups, and to name those groups, or otherwise identify or name the steps or groups. This is indicated by blocks 424 and 426 in FIG. 3C.

Component 336 can also illustratively display a validation user input mechanism. This allows the user to insert a validation into the task recording. By way of example, assume that the user is to actuate a dropdown menu user input mechanism and select the first item in the dropdown menu. The user of development environment 128 can insert a validation that stops the task recording playback and displays a message such as "Ensure that you have selected the first item in the dropdown menu". The validation can also display a "Confirm" user input mechanism which can be actuated by the subsequent user viewing the playback, in order to validate that the selection has been made, and to continue the playback. Entering a validation is indicated by block 428.

Component 336 also illustratively displays user input mechanisms that can be actuated by the user in order to attach attachments to a step, or links to attachments. This is indicated by block 430. In that case, during the playback, the attachments or links can be displayed, in line, in the task recording, and displayed in conjunction with the particular step to which they are attached. For instance, the user of development environment 128 may attach explanatory documentation, a video link, or other items that provide additional information about a given step or user interaction that is to be performed. These links or attachments can be displayed, in line, as that step is about to be performed, so that the user can view the attachments, links, etc. Similarly, the user input mechanisms can allow the user to enter comments or descriptions. This is indicated by block 432. Component 336 can display the development interface that allows the user to perform other development activities as well, and this is indicated by block 434.

Component 336 then plays the task recording in the development environment 128 and modifies it, based upon the sensed development inputs described above. This is indicated by block 436. Once the task recording has been played back and modified in development environment 128, it is output for further processing. This is indicated by block 438. For instance, it can be stored in task recording store 112. This is indicated by block 440. It can be output to test generation system 118, as indicated by block 442. It can be output in other ways as well, and this is indicated by block 444.

Figure 3D:
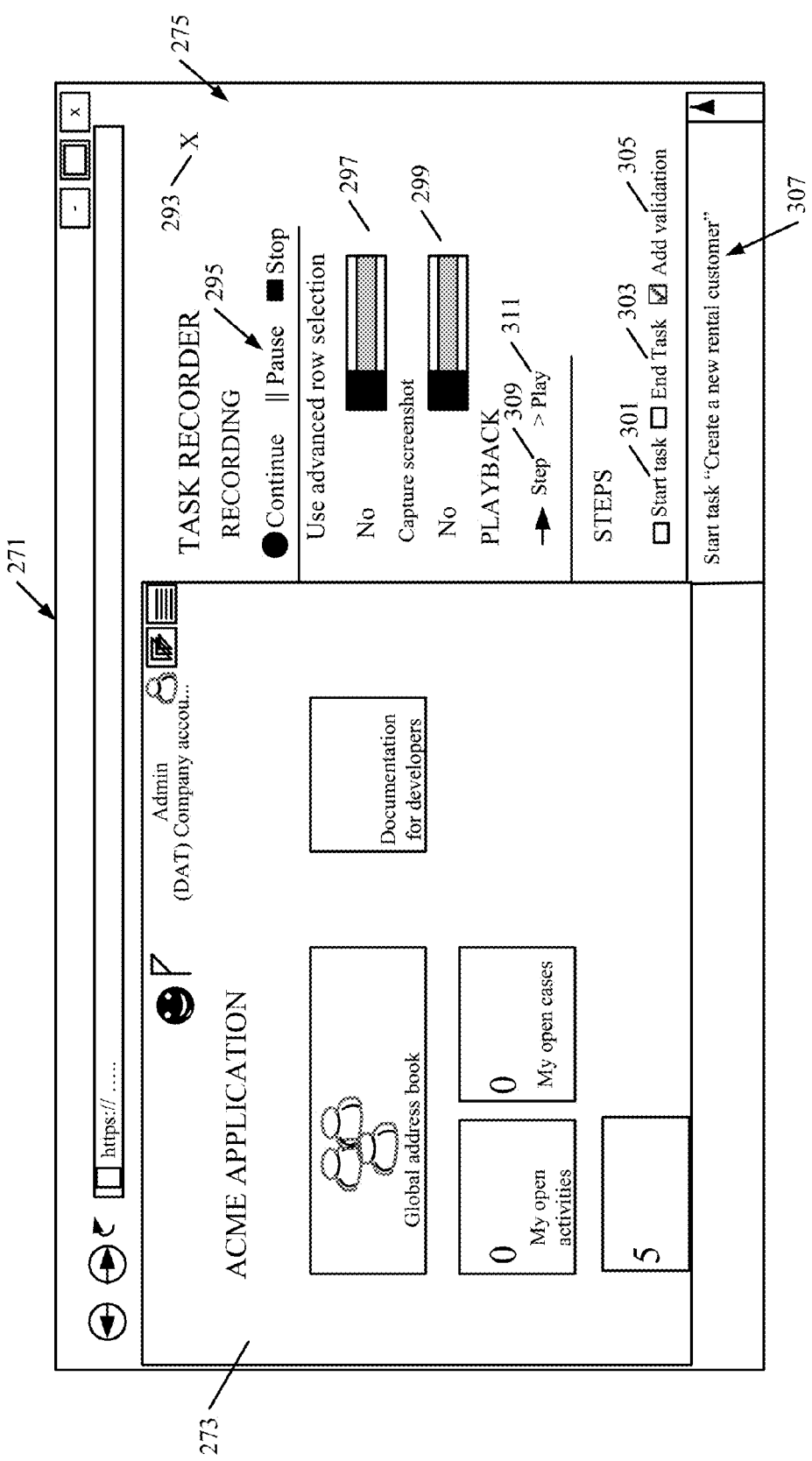
FIG. 3D shows an example of a user interface display.

FIG. 3D shows another example of a user interface display that can be generated by playback system 116, during playback. Display 271 shown in FIG. 3D is similar to that shown in FIG. 2F and similar items are similarly numbered. However, FIG. 3D shows that step display portion 307 now has one or more recorded steps displayed therein, and playback controls 309 and 311 are also displayed. The user can play back the recording in a step-wise mode or a continuous mode. When the user actuates the step input mechanism 309, the playback system 116 executes the next step in the recording, and then pauses. When the user actuates the play input mechanism 311, the system begins sequential execution of the remaining steps in the recording until the playback is paused or all steps are executed. In one example, when the recording is playing, then mechanism 311 becomes a pause button.

It can thus be seen that, once the task recording is generated, it can be played back to automatically control computing system 102, or a corresponding application 144, or both, based upon the sensed interactions recorded in the task recording. It can also be played back in a development environment where it can be modified to control the computing system 102 or application 144 (or both) in different ways. It can be played back in a tutorial environment where it is displayed for tutorial purposes.

Figure 4:
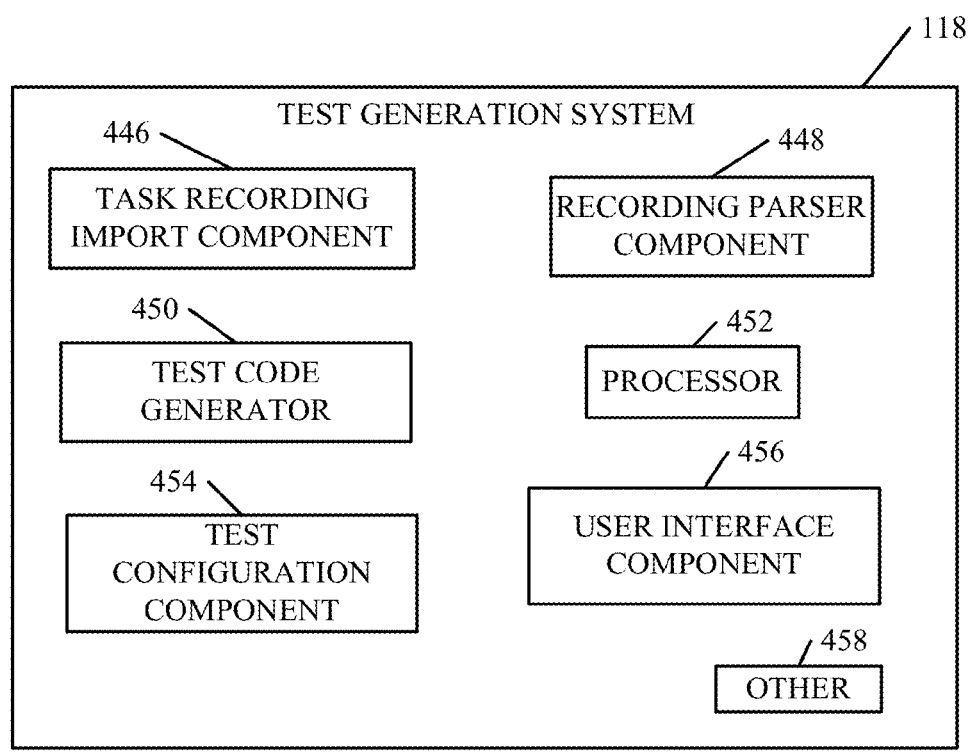
FIG. 4 is a more detailed block diagram of one example of a test generation system.
Figure 4A:
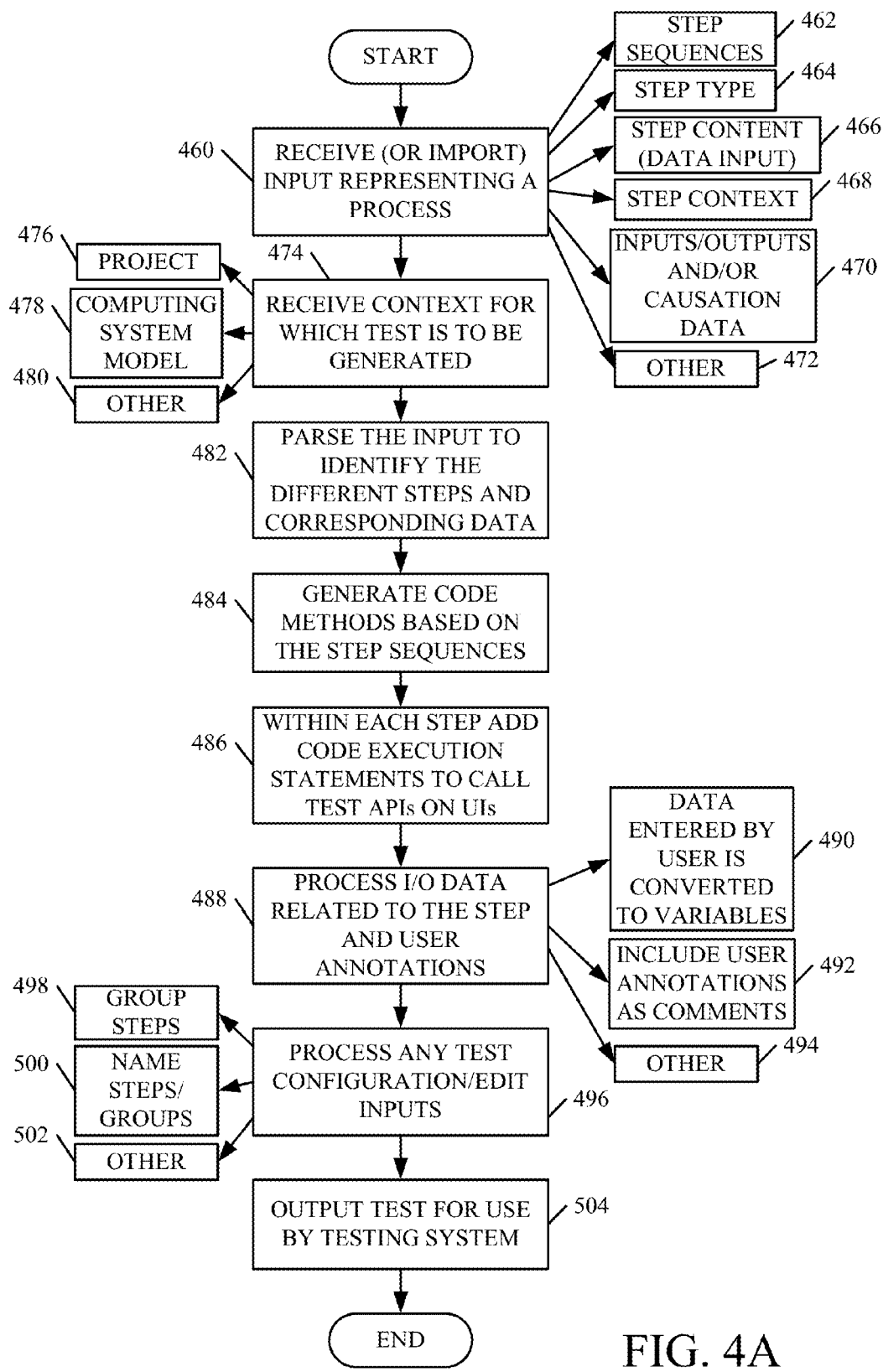
FIG. 4A is a flow diagram showing one example of the operation of the test generation system shown in FIG. 4.

FIG. 4 is a block diagram illustrating one example of test generation system 118, in more detail. In the example shown in FIG. 4, test generation system 118 illustratively includes task recording import component 446, recording parser component 448, test code generator 450, one or more processors or servers 452, test configuration component 454, user interface component 456, and it can include other items 458. FIG. 4A is a flow diagram illustrating one example of the operation of test generation system 118, in automatically generating a test for the application 144 or computing system 102 (or both) based upon a given task recording. Task recording import component 446 first receives or imports a task recording 115 representative of the recorded task or process. This is indicated by block 460. The task recording, as described above, can include a set of step sequences 462, step types 464, step content 466, step context 468, inputs/outputs and/or causation data 470, or other items 472.

User interface component 456 can generate a user interface display with user input mechanisms that allow a user to input a context for which the test is to be generated. This is indicated by block 474. For instance, it may identify a project 476, a computing system model 478, or other items 480 against which the test will be run.

Recording parser component 448 then parses the input to identify the different steps and their corresponding data. This is indicated by block 482.

Test code generator 450 then generates code methods based upon the step sequences. This is indicated by block 484. For instance, it can generate methods with code execution statements that call the appropriate application test APIs 140 in computing system 102. Adding code execution statements to call the test APIs is indicated by block 486 in FIG. 4A.

Code generator 450 also illustratively processes input/output data related to each step as well as user annotations that are provided to each step. This is indicated by block 488. For instance, it can identify the actual data entered by the user and convert that data into variables as indicated by block 490. Thus, the specific data driving the test can be changed independently of the test execution flow.

It can process user annotations to the task recording as comments that are displayed during the test. This is indicated by block 492. It can process the data related to the step and user annotations in other ways, as indicated by block 494.

In one example, test generation system 118 uses test configuration component 454 to generate a user interface display that allows a user to configure or modify the test. It processes any test configuration or modification or edit inputs. This is indicated by block 496. For instance, component 454 can allow a user to group the steps in the test into groups. This is indicated by block 498. It can allow the user to name the steps or groups, as indicated by block 500, and it can perform other actions as well, as indicated by block 502.

Once the test is generated, it is output by test generation system 118 for use by a testing system 124. This is indicated by block 504. For instance, it can be output to test store 120 for later access by testing system 124, so testing system 124 can run it against an application or another portion of a computing system 102.

Figure 5:
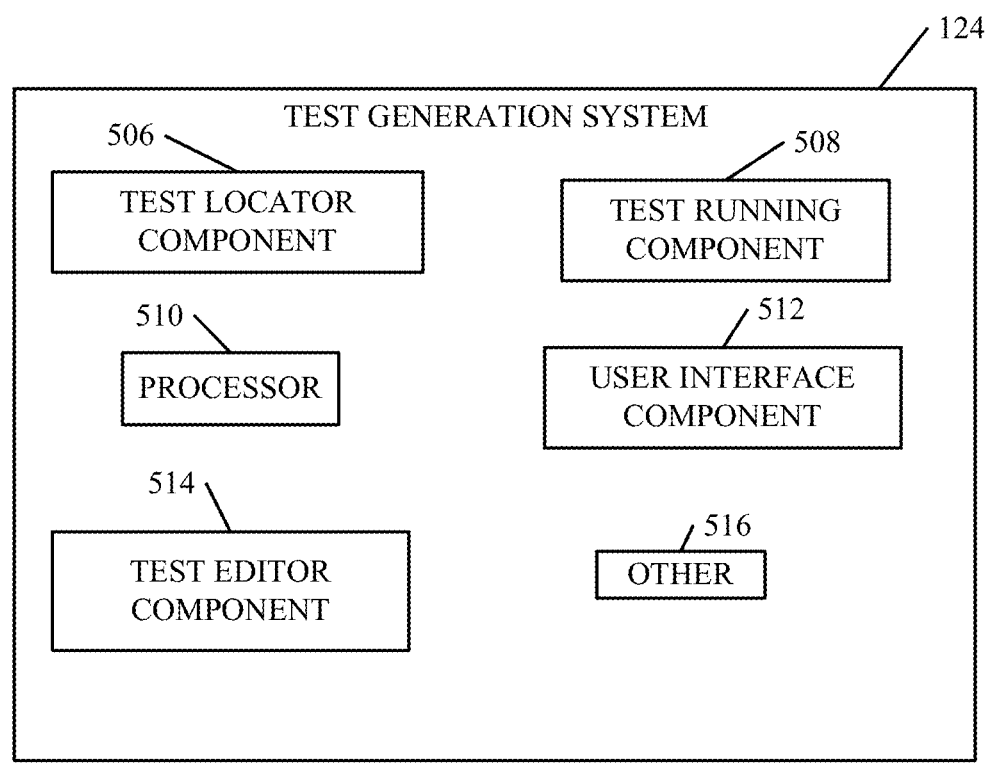
FIG. 5 is a more detailed block diagram of one example of a test system.
Figure 5A:
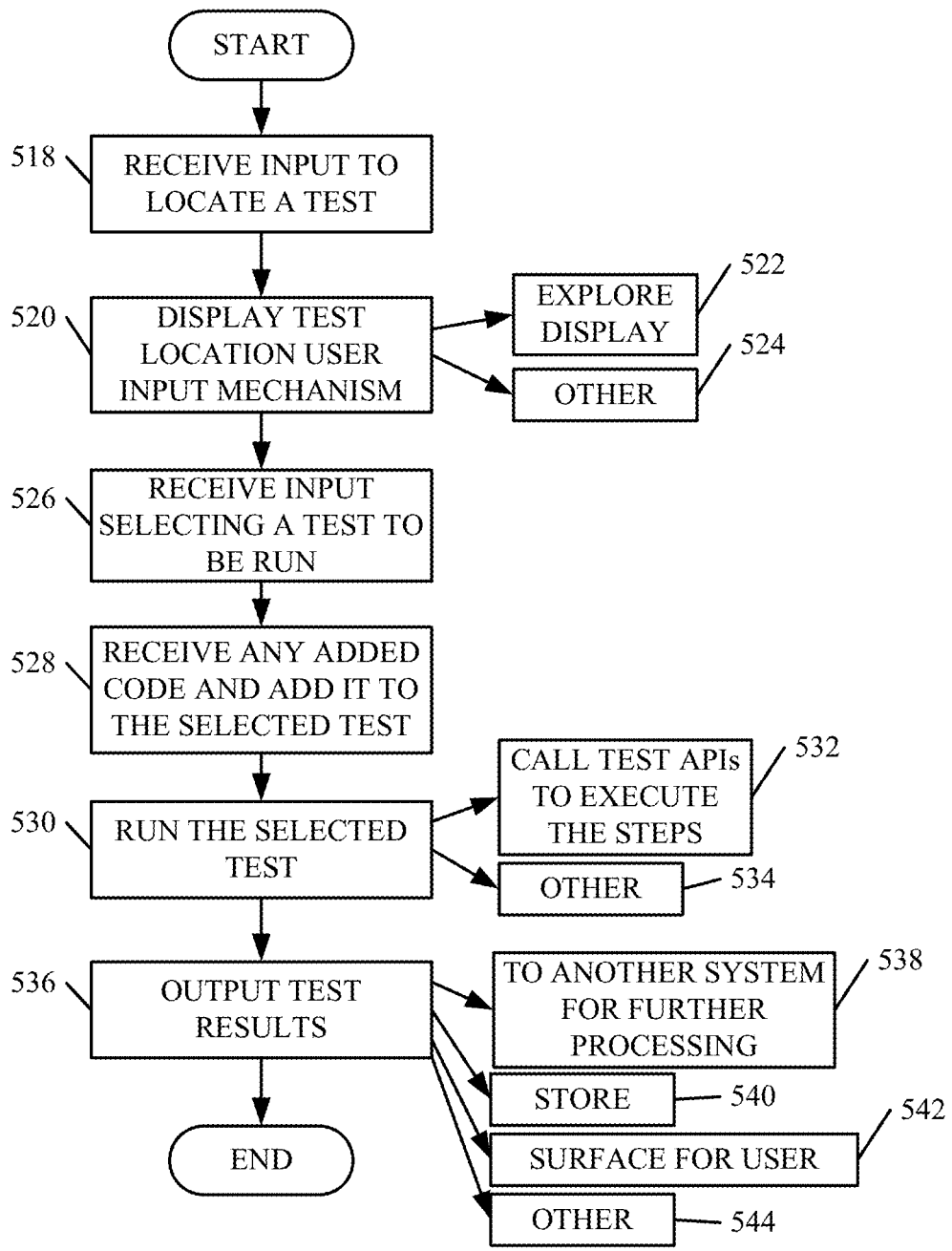
FIG. 5A is a flow diagram illustrating one example of the operation of the test system showing in FIG. 5.

FIG. 5 is a more detailed block diagram showing one example of testing system 124. In the example shown in FIG. 5, testing system 124 illustratively includes test locator component 506, test running component 508, one or more servers or processors 510, user interface component 512, test editor component 514, and it can include other items 516. FIG. 5A is a flow diagram illustrating one example of the operation of test system 124 in finding and running a test against an application or other part of computing system 102. FIGS. 5 and 5A will now be described in conjunction with one another.

Test locator component 506 illustratively displays a user input mechanism that can be actuated by a user in order to locate a test. This is indicated by block 518 in FIG. 5A. For instance, test locator component 506 can be an explorer window that allows a user to search for and navigate to, and then select, a given test.

User interface component 512 then displays the test location user input mechanism 520 which, as described above, can be an explorer or other search display 522, or another display 524. It then receives or senses a user input selecting a test to be run. This is indicated by block 526.

Test editor component 514 illustratively displays user input mechanisms that can be invoked in order to edit the test, before it is run. Component 514 thus receives any added code and adds it to (or otherwise modifies) the selected test. This is indicated by block 528.

Test running component 508 then runs the selected test, as indicated by block 530. In doing so, it illustratively calls the test APIs 140 to execute the steps against the forms or other user interface displays (and corresponding controls) of the application under test in computing system 102. This is indicated by block 532. It can run the selected test in other ways, as indicated by block 534.

Component 508 then outputs test results. This is indicated by block 536. The results can be output to another system 130 for further processing. This is indicated by block 538. They can also be stored in test result store 126, as indicated by block 540. The test results can be surfaced on a user interface display for display to the user. This is indicated by block 542. The test results can be output in other ways as well, and this is indicated by block 544.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5B:
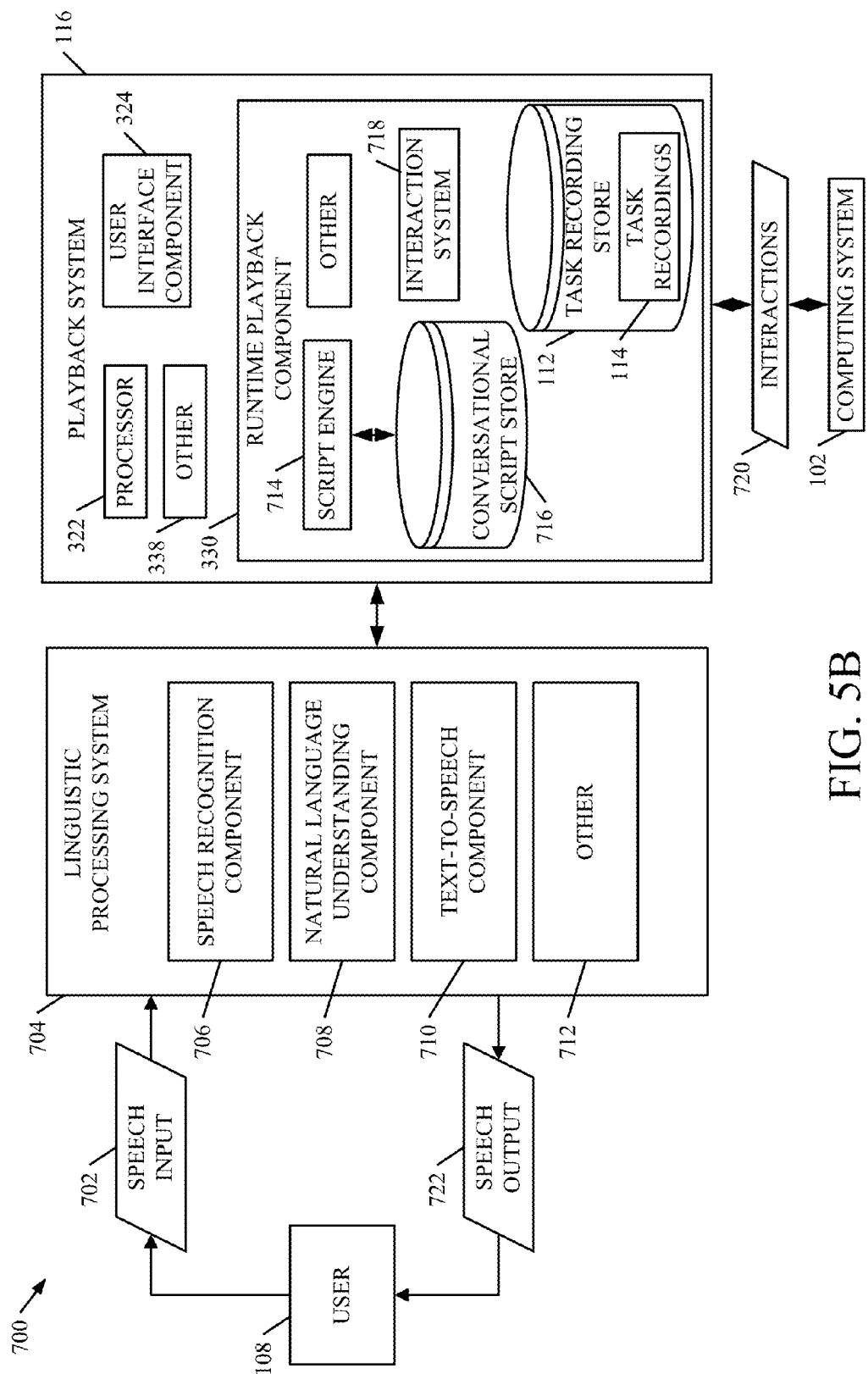
FIG. 5B is a block diagram of another example architecture.

FIG. 5B is another example of an architecture 700 ion which user 108 (or another user) can access the task recordings 114 in task recording store 112, for runtime playback and execution, using speech commands. Architecture 700, in one example, thus includes linguistic processing system 704, which, itself, illustratively includes speech recognition component 706, natural language understanding component 708, text-to-speech component 710, and it can include other items 712. Playback system 116, in the example shown in FIG. 5B includes the items shown above in FIG. 3 (some of which are shown in FIG. 5B) along with script engine 714, conversational script store 716, and interaction system 718.

In one example, user 108 wishes to perform a task for which a recording has been generated. Thus, user 108 provides a speech input 702 to initiate the task. The task initiating speech input 702 thus identifies the task the user wishes to run. An input may be, for example, "I want to enter an expense." Speech recognition component 706 converts the speech input 702 into text and provides it to natural language understanding component 708. Component 708 generates an interpretation of the speech recognition result and provides it to script engine 714. The interpretation will thus indicate that the user wishes to initiate the task of entering an expense. Script engine 714 accesses the task recording 114 for entering an expense and then accesses script store 716 and retrieves a script, for that task recording, that it uses in guiding user 108 through the task that has been initiated. Alternatively, the script may be contained in the task recording 114 or be accessed separately from the task recording. The script illustratively includes step elements corresponding to steps in the task. The step elements are arranged in a sequence or order, based on the particular task. The order can branch or change based on user response.

Engine 714 walks the user through the steps in the task, based on the step elements, by providing outputs (or script responses) that audibly prompt the user to perform the steps in the task, in the given order. The script responses are based on the steps to be performed in the initiated task, and are output by providing them to text-to-speech component 710. Component 710 generates a speech output 722 for user 108. The speech outputs reflect the script responses and audibly guide the user in completing the steps to perform the task.

User 108 can provide speech inputs 702 (or touch inputs or other inputs) to complete steps in the task. The inputs may be prompted by script engine 714, or otherwise. For instance, script engine 714 may prompt user 108 to "select an expense category", and the user may respond with "hotel". The script engine 714 may then prompt the user 108 to "enter an amount." User 108 may respond with a monetary amount, and so forth.

When user 108 has input sufficient information (or completed sufficient steps) that playback system 116 can take action within computing system 102 (or in a backend system), then interaction system 718 generates interactions 720 with that computing system. The interactions can be with applications 144, processes 146, workflows 148, tasks 150, entities 152, forms 154 or any other computing system functionality in computing system 102, in a backend system, or in any other systems 130. For instance, the interactions may be to submit an expense report within the data store in the computing system, reflecting the expense just entered by the user, or any other interactions with the applications, data store or other items that are affected by the task that the user 108 just completed.

Figure 6:
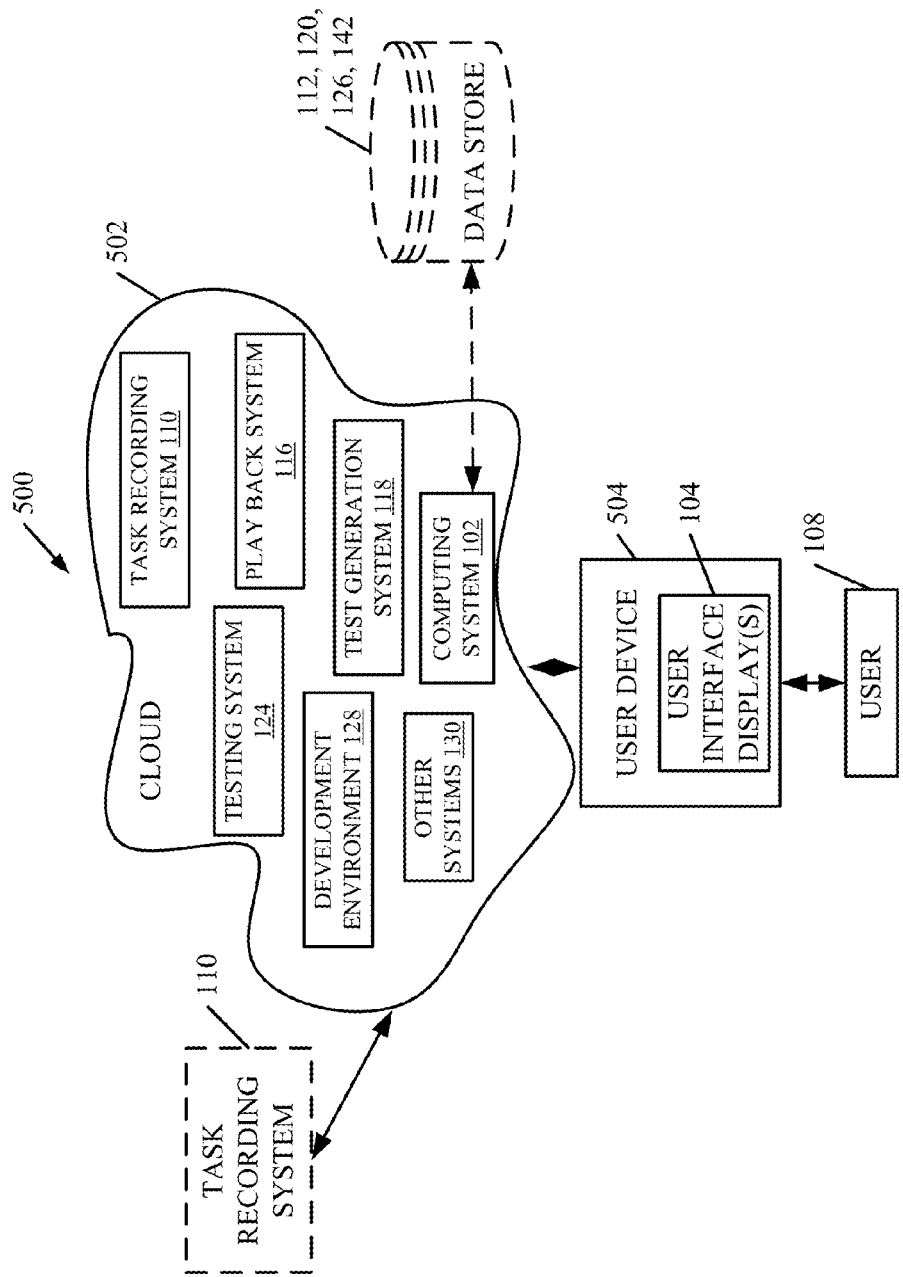
FIG. 6 is a block diagram of one example of the architecture shown in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that the items in architecture 100 can be located in cloud 502 (which can be public, private, or a combination where portions are public while others are private). Therefore, user 108 uses a user device 504 to access those systems through cloud 502.

FIG. 6 also depicts another example of a cloud architecture. FIG. 6 shows that it is also contemplated that some elements of architecture 100 can be disposed in cloud 502 while others are not. By way of example, data stores 112, 120, 126 and 142 can be disposed outside of cloud 502, and accessed through cloud 502. In another example, task recording system 110, or other items, can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
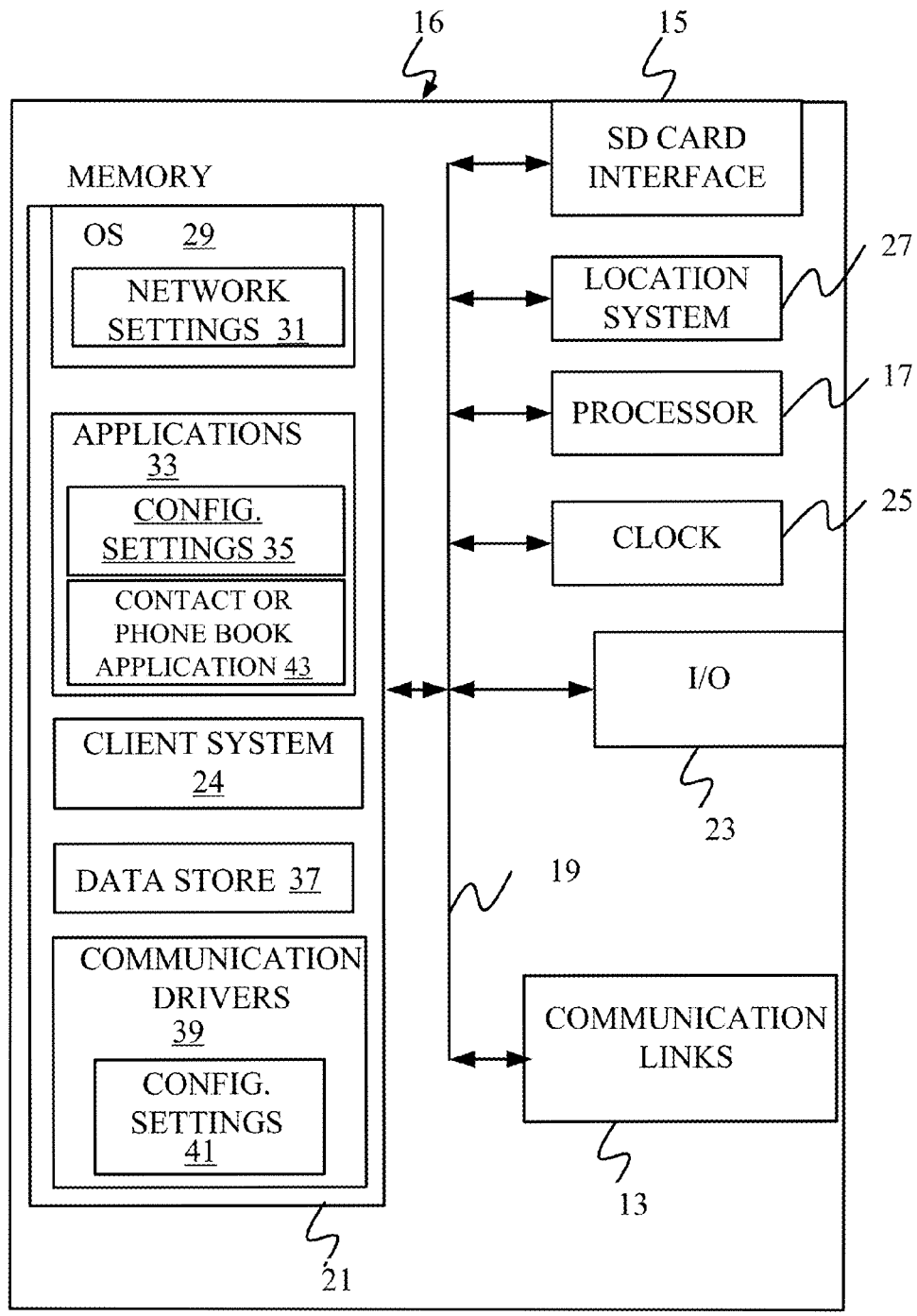
FIGS. 7-9 show various examples of mobile devices.
Figure 8:
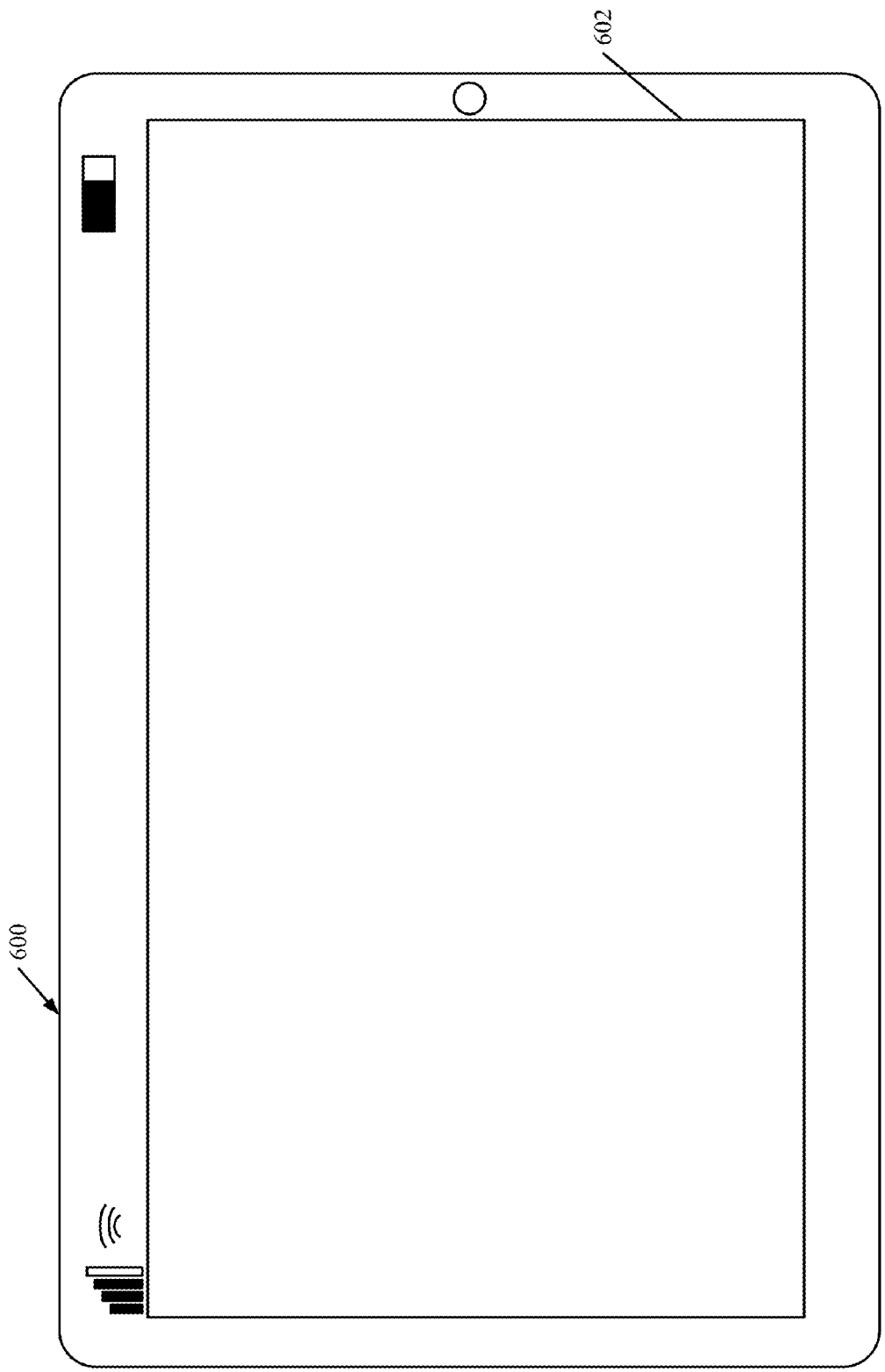
Figure 9:
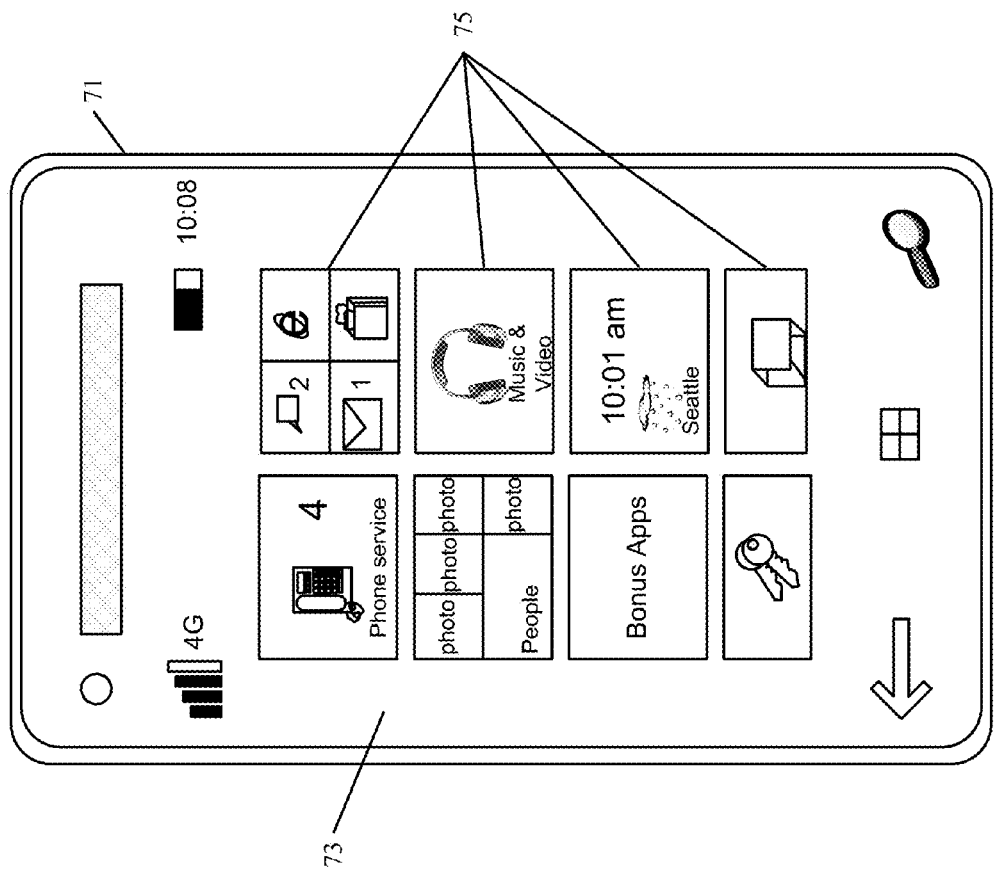

FIG. 7 is a simplified block diagram of one illustrative embodiment of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 132, 160, 322, 452 or 510 from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some example, the phone also includes a Secure Digital (SD) card slot that accepts a SD card.

The mobile device can also be a personal digital assistant (PDA) or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 9 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
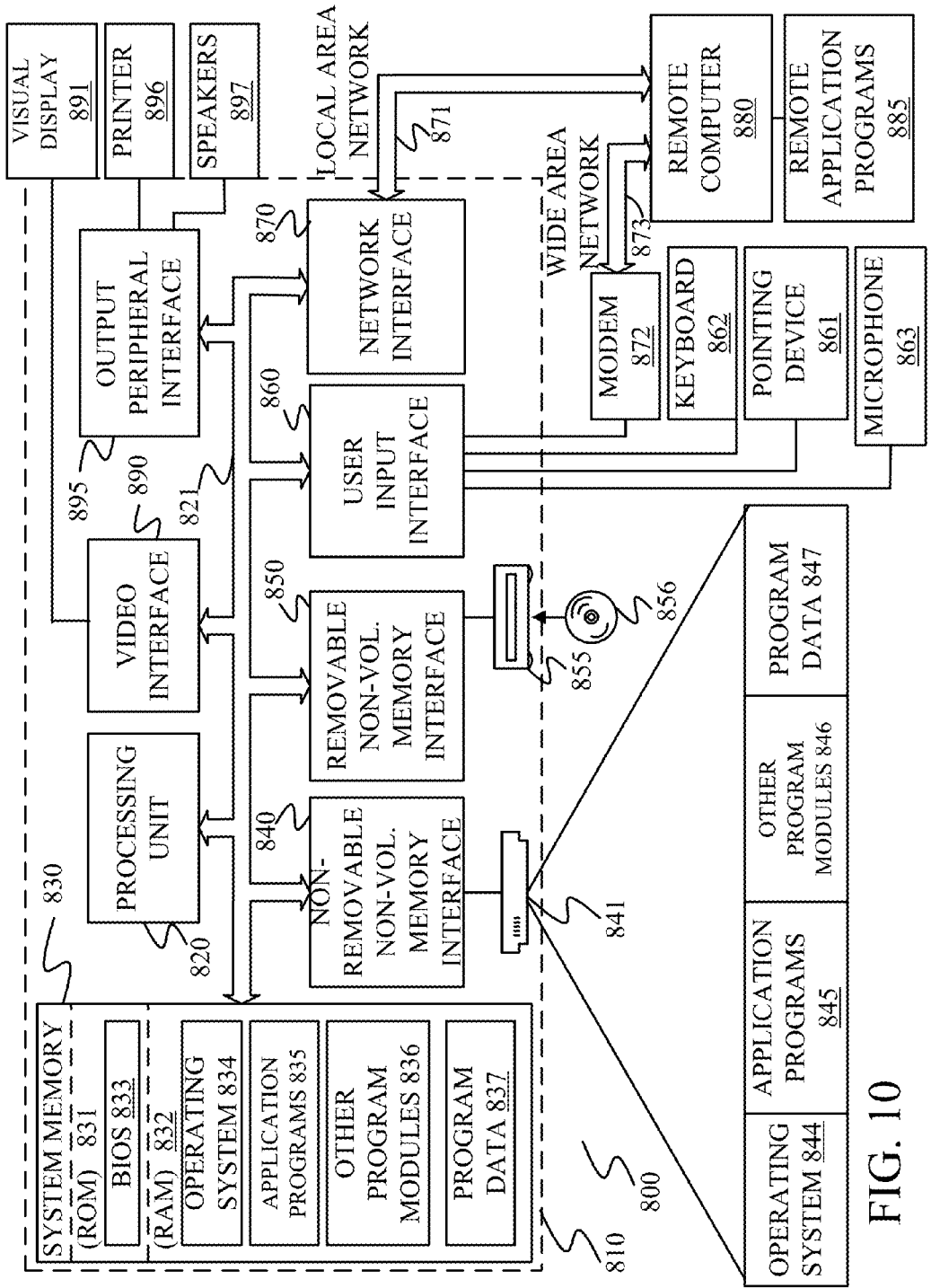
FIG. 10 is a block diagram of one example of a computing environment that can be deployed in the architecture illustrated in FIG. 1.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processor 132, 160, 322, 452 or 510), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

It will be noted that the above discussion has described a variety of different systems, or components. They can also be implemented as logic. It will be appreciated that such systems, components and/or logic can be comprised of hardware items (such as processors and associated memory, or other processing components, some of which are described above) that perform the functions associated with those systems, components and/or logic. In addition, the systems, components and/or logic can be comprised of software that is loaded into a memory and is subsequently executed by a processor or server, or other computing component, as described above. It will be noted that the above discussion has described a variety of different systems, components and/or logic. It will be appreciated that such systems, components and/or logic can be comprised of hardware items (such as processors and associated memory, or other processing components, some of which are described above) that perform the functions associated with those systems, components and/or logic. In addition, the systems, components and/or logic can be comprised of software that is loaded into a memory and is subsequently executed by a processor or server, or other computing component, as described above. The systems, components and/or logic can also be comprised of different combinations of hardware, software, firmware, etc., some examples of which are described above. These are only some examples of different structures that can be used to form the systems, components and/or logic described above. Other structures can be used as well.

Example 1 is a computing system, comprising:

a linguistic processing system that receives a task initiating speech input and generates a recognition result indicative of a task identified in the task initiating speech input; and a script engine that identifies a script corresponding to the task, based on the recognition result, the script including step elements that generate step outputs indicative of steps to be performed in completing the task, the script engine running the script by generating the step outputs, in an order identified by the script and based on responsive user inputs, the linguistic processing system generating a speech output indicative of each of the step outputs generated by the script engine.

Example 2 is the computing system of any or all previous examples and further comprising:

an interaction system that generates an interaction with a computing system component, based on user performance of the task.

Example 3 is the computing system of any or all previous examples wherein the interaction system generates the interactions with the computing system component in a separate computing system.

Example 4 is the computing system of any or all previous examples wherein the linguistic processing system comprises:

a speech recognition component that receives the task initiating speech input and the responsive user inputs and generates corresponding textual outputs.

Example 5 is the computing system of any or all previous examples wherein the linguistic processing system comprises:

a natural language understanding component that receives the textual outputs from the speech recognition system and generates an interpretation corresponding to each of the textual outputs and provides the interpretations to the script engine, as the recognition result.

Example 6 is the computing system of any or all previous examples wherein the linguistic processing system comprises:

a text-to-speech component that generates the speech outputs based on the step outputs generated by the script engine.

Example 7 is the computing system of any or all previous examples wherein the speech outputs, corresponding to the script outputs, comprise audible prompts to perform a next step in the task.

Example 8 is the computing system of any or all previous examples wherein the script engine generates the step outputs based on responsive user speech inputs.

Example 9 is the computing system of any or all previous examples and further comprising:

a touch sensitive user interface device and wherein the script engine generates the step outputs based on responsive user touch inputs.

Example 10 is a computer implemented, comprising:

receiving a task initiating speech input;

generating a recognition result indicative of a task identified in the task initiating speech input;

identifying a script corresponding to the task, based on the recognition result, the script including step elements that generate step outputs indicative of steps to be performed in completing the task;

running the script by generating the step outputs, in an order identified by the script and based on responsive user inputs and by generating a speech output indicative of each of the step outputs.

Example 11 is the computer implemented method of any or all previous examples and further comprising:

generating an interaction with a computing system component, based on user performance of the task.

Example 12 is the computer implemented method of any or all previous examples wherein generating the interactions with the computing system component comprises:

generating the interactions with the computing system component in a separate computing system.

Example 13 is the computer implemented method of any or all previous examples wherein generating the recognition result comprises:

receiving the task initiating speech input and the responsive user inputs; and generating corresponding textual outputs.

Example 14 is the computer implemented method of any or all previous examples wherein generating the recognition result comprises:

generating an interpretation corresponding to each of the textual outputs; and outputting the interpretations as the recognition result.

Example 15 is the computer implemented method of any or all previous examples wherein generating the recognition result comprises:

generating the speech outputs based on the step outputs generated by the script engine.

Example 16 is the computer implemented method of any or all previous examples wherein generating the speech outputs, corresponding to the script outputs, comprises:

generating audible prompts to perform a next step in the task.

Example 17 is the computer implemented method of any or all previous examples wherein generating the step outputs comprises:

generating the step outputs based on responsive user speech inputs.

Example 18 is the computer implemented method of any or all previous examples wherein generating the step outputs comprises:

generating the step outputs based on responsive user touch inputs.

Example 19 is a computing system, comprising:

a linguistic processing system that receives a task initiating speech input and generates a recognition result indicative of a task identified in the task initiating speech input;

a script engine that identifies a script corresponding to the task, based on the recognition result, the script including step elements that generate step outputs indicative of steps to be performed in completing the task, the script engine running the script by generating the step outputs, in an order identified by the script, the linguistic processing system generating speech outputs based on the step outputs, the speech outputs audible instructing the user to perform the steps, the script engine receiving responsive user inputs that are responsive to the step outputs, and generating any additional step outputs based on responsive user inputs, the linguistic processing system generating additional speech outputs indicative of each of the additional step outputs generated by the script engine; and an interaction system that generates an interaction with a backend computing system component, based on user performance of the steps in the task.

Example 20 is the computing system of any or all previous examples wherein the linguistic processing system comprises:
a speech recognition component that receives the task initiating speech input and the responsive user inputs and generates corresponding textual outputs;
a natural language understanding component that receives the textual outputs from the speech recognition system and generates an interpretation corresponding to each of the textual outputs and provides the interpretations to the script engine, as the recognition result; and
a text-to-speech component that generates the speech outputs based on the step outputs generated by the script engine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing system, comprising:
a processor; and
memory storing instructions executable by the processor, wherein the instructions, when executed, configure the computing system to provide:
a linguistic processing system configured to:
receive an indication of a task initiating speech input; and
generate a recognition result indicative of a task identified in the task initiating speech input; and
a script engine configured to:
based on the recognition result, identify a script that correspond to the task and includes step elements configured to generate step outputs indicative of computing steps to be performed in completing the task; and
run the script to:
generate the step outputs, in an order identified by the script and based on indications of responsive user inputs, wherein the linguistic processing system is configured to generate a speech output indicative of each of the step outputs generated by the script engine; and
generate machine instructions that execute the computing steps in the computing system based on the indications of the responsive user inputs.
2. The computing system of claim 1, wherein the machine instructions comprise an interaction with a computing system component.
3. The computing system of claim 2, wherein the computing system comprises a first computing system, and the computing system component comprises a component in a second computing system, that is separate from the first computing system.
4. The computing system of claim 1, wherein the linguistic processing system comprises:
a speech recognition component configured to:
receive the indication of the task initiating speech input,
receive the indications of the responsive user inputs, and
generate a textual output that corresponds to one or more of the task initiating speech input and the responsive user inputs.

5. The computing system of claim 4, wherein the linguistic processing system comprises:
a natural language understanding component configured to:
receive the textual output from the speech recognition system, and
generate an interpretation corresponding to the textual output, and
provide the interpretation to the script engine, as the recognition result.
6. The computing system of claim 5, wherein the linguistic processing system comprises:
a text-to-speech component configured to:
generate the speech outputs based on the step outputs generated by the script engine.
7. The computing system of claim 1, wherein the speech outputs, corresponding to the script outputs, comprise audible prompts indicative of a next step in the task.
8. The computing system of claim 1, wherein the indications of responsive user inputs comprise indications of responsive user speech inputs, and the script engine is configured to generate the step outputs based on the indications of the responsive user speech inputs.
9. The computing system of claim 1, wherein the indications of responsive user inputs comprise indications of responsive user touch inputs received from a touch sensitive user interface device, and the script engine is configured to generate the step outputs based on the indications of the responsive user touch inputs.
10. A computer implemented method, comprising:
receiving an indication of a task initiating speech input;
generating a recognition result indicative of a task identified in the task initiating speech input;
based on the recognition result, identifying a script that corresponds to the task and includes step elements configured to generate step outputs indicative of computing steps to be performed in completing the task; and
running the script by:
generating the step outputs, in an order identified by the script and based on indications of responsive user inputs;
generating a speech output indicative of each of the step outputs; and
generating machine instructions that execute the computing steps in a computing system based on the indications of the responsive user inputs.
11. The computer implemented method of claim 10, wherein the machine instructions comprise an interaction with a computing system component.
12. The computer implemented method of claim 11, wherein the machine instructions are generated by a first computing system, and the computing system component comprises a component in a second computing system that is separate from the first computing system.
13. The computer implemented method of claim 11, wherein generating the recognition result comprises:
receiving the indications of the task initiating speech input and the responsive user inputs; and
generating a textual output that corresponds to one or more of the task initiating speech input and the responsive user inputs.
14. The computer implemented method of claim 13, wherein generating the recognition result comprises:
generating an interpretation corresponding to the textual output; and
outputting the interpretation as the recognition result.

15. The computer implemented method of claim 10, wherein generating the speech outputs, corresponding to the script outputs, comprises:
 generating audible prompts indicative of a next step in the task.

16. The computer implemented method of claim 10, wherein the indications of responsive user inputs comprise indications of responsive user speech inputs, and wherein generating the step outputs comprises:
 generating the step outputs based on the indications of the responsive user speech inputs.

17. The computer implemented method of claim 10, wherein the indications of responsive user inputs comprise indications of responsive user touch inputs received from a touch sensitive user interface device, and wherein generating the step outputs comprises:
 generating the step outputs based on the indications of the responsive user touch inputs.

18. A computing system, comprising:
 a processor; and
 memory storing instructions executable by the processor, wherein the instructions, when executed, configure the computing system to provide:
  a linguistic processing system configured to:
   receive an indication of a task initiating speech input; and
   generate a recognition result indicative of a task identified in the task initiating speech input;
  a script engine configured to:
   based on the recognition result, identify a script that corresponds to the task and includes step elements configured to generate step outputs indicative of computing steps to be performed in completing the task;
   run the script to:
    generate the step outputs, in an order identified by the script, wherein
    the linguistic processing system is configured to generate speech outputs that are based on the step outputs represent audible instructions indicative of the steps,
    the script engine is configured to receive indications of responsive user inputs that are responsive to the step outputs, and generate an additional step output based on indications of the responsive user inputs, and
    the linguistic processing system is configured to generate an additional speech output indicative of the additional step output generated by the script engine; and
  an interaction system configured to generate machine instructions that execute the computing steps in the computing system based on the indications of the responsive user inputs.

19. The computing system of claim 18, wherein the linguistic processing system comprises:
 a speech recognition component configured to receive an indications of the task initiating speech input and the responsive user inputs, and to generate a textual output that corresponds to one or more of the task initiating speech input and the responsive user inputs;
 a natural language understanding component configured to receive the textual output from the speech recognition system, generate an interpretation corresponding to the textual output, and provide the interpretation to the script engine, as the recognition result; and
 a text-to-speech component configured to generate the speech outputs based on the step outputs generated by the script engine.

\* \* \* \* \*